United States Patent
Kleynen

(10) Patent No.: US 9,346,002 B2
(45) Date of Patent: May 24, 2016

(54) CRANKCASE VENTILATION FILTER ASSEMBLY, COMPONENTS, AND METHODS

(75) Inventor: Christof Kleynen, Zichem (BE)

(73) Assignee: Donaldson Company, Inc., Minneapolis, MN (US)

( * ) Notice: Subject to any disclaimer, the term of this patent is extended or adjusted under 35 U.S.C. 154(b) by 147 days.

(21) Appl. No.: 13/996,281

(22) PCT Filed: Dec. 21, 2011

(86) PCT No.: PCT/US2011/066598
§ 371 (c)(1),
(2), (4) Date: Oct. 17, 2013

(87) PCT Pub. No.: WO2012/088317
PCT Pub. Date: Jun. 28, 2012

(65) Prior Publication Data
US 2014/0033668 A1     Feb. 6, 2014

Related U.S. Application Data

(60) Provisional application No. 61/425,869, filed on Dec. 22, 2010.

(51) Int. Cl.
*B01D 46/24*    (2006.01)
*B01D 29/21*    (2006.01)
*B01D 35/16*    (2006.01)
*B01D 35/30*    (2006.01)
(Continued)

(52) U.S. Cl.
CPC ............ *B01D 46/2414* (2013.01); *B01D 29/21* (2013.01); *B01D 35/16* (2013.01); *B01D 35/30* (2013.01); *B01D 46/003* (2013.01); *F01M 13/04* (2013.01); *B01D 2201/291* (2013.01); *B01D 2201/293* (2013.01); *B01D 2201/295* (2013.01); *B01D 2201/296* (2013.01); *B01D 2201/34* (2013.01); *B01D 2201/40* (2013.01); *B01D 2271/02* (2013.01); *B01D 2271/027* (2013.01); *F01M 2013/0438* (2013.01)

(58) Field of Classification Search
CPC ..................... B01D 46/2414; B01D 2201/291; B01D 2271/02; B01D 2271/027; B01D 46/2411; F01M 13/04; F01M 2013/0438
See application file for complete search history.

(56) References Cited

U.S. PATENT DOCUMENTS 4,272,368 A    6/1981    Foord et al.
4,783,271 A    11/1988   Silverwater
(Continued)

FOREIGN PATENT DOCUMENTS

WO    WO 98/43723      10/1998
WO    WO 2005/099861   10/2005
(Continued)

OTHER PUBLICATIONS

U.S. Appl. No. 60/962,993, filed Aug. 2, 2007, Jacob.
(Continued)

*Primary Examiner* — Robert Clemente
(74) *Attorney, Agent, or Firm* — Merchant & Gould P.C.

(57) ABSTRACT

Crankcase ventilation filter assemblies, components thereof, features thereof, and methods of assembly and use are described. An example assembly is characterized in which the assembly includes a housing having an access cover and a base, and a filter cartridge is configured to sealingly engage both the access cover and the base, in preferred manners.

26 Claims, 16 Drawing Sheets

(51) Int. Cl.
*B01D 46/00* (2006.01)
*F01M 13/04* (2006.01)

(56) References Cited

U.S. PATENT DOCUMENTS

| | | | |
|---|---|---|---|
| D416,308 S | 11/1999 | Ward et al. |
| 6,217,755 B1 | 4/2001 | Stifelman et al. |
| 6,652,614 B2 | 11/2003 | Gieseke et al. |
| 6,752,924 B2 | 6/2004 | Gustafson et al. |
| 6,936,084 B2 | 8/2005 | Schlensker et al. |
| 6,986,805 B2 | 1/2006 | Gieseke et al. |
| 7,494,017 B2 | 2/2009 | Miller |
| 7,618,480 B2 | 11/2009 | Barnwell et al. |
| 7,828,881 B2 | 11/2010 | Barnwell et al. |
| 8,066,791 B2 | 11/2011 | Baseotto et al. |
| 8,119,002 B2 | 2/2012 | Schiavon et al. |
| 8,163,056 B2 | 4/2012 | Coulonvaux et al. |
| 8,177,874 B2 | 5/2012 | Bittle et al. |
| 8,177,971 B2 | 5/2012 | Bittle et al. |
| 8,177,976 B2 | 5/2012 | Formica |
| 8,292,984 B2 | 10/2012 | Baseotto et al. |
| 8,404,029 B2 | 3/2013 | Lundgren et al. |
| 8,440,079 B2 | 5/2013 | Greco et al. |
| 8,632,676 B2 | 1/2014 | Formica |
| 2004/0035097 A1 | 2/2004 | Schlensker et al. |
| 2004/0134171 A1 | 7/2004 | Scott et al. |
| 2005/0028500 A1 | 2/2005 | Gieseke et al. |
| 2005/0035053 A1 | 2/2005 | Engelhard et al. |
| 2005/0252848 A1 | 11/2005 | Miller |
| 2007/0108119 A1 | 5/2007 | Mandt et al. |
| 2009/0049814 A1 | 2/2009 | Baseotto et al. |
| 2009/0057213 A1 | 3/2009 | Schiavon et al. |
| 2009/0071111 A1 | 3/2009 | Lundgren |
| 2009/0145095 A1 | 6/2009 | Juliar et al. |
| 2009/0249756 A1 | 10/2009 | Schrage et al. |
| 2009/0272085 A1 | 11/2009 | Gieseke et al. |
| 2010/0065481 A1 | 3/2010 | Formica et al. |
| 2010/0146920 A1 | 6/2010 | Iddings et al. |
| 2010/0154371 A1 | 6/2010 | Bittle et al. |
| 2011/0017155 A1 | 1/2011 | Jacob |
| 2011/0258975 A1 | 10/2011 | Lundgren et al. |
| 2014/0102060 A1 | 4/2014 | Kato et al. |
| 2014/0208702 A1 | 7/2014 | Lundgren et al. |
| 2014/0215982 A1 | 8/2014 | Wood et al. |

FOREIGN PATENT DOCUMENTS

| | | |
|---|---|---|
| WO | WO 2008/157251 | 12/2008 |
| WO | WO 2009/018454 | 2/2009 |
| WO | WO 2009/046019 | 4/2009 |
| WO | WO 2009/149186 | 12/2009 |
| WO | WO 2010/117799 | 10/2010 |
| WO | 2011/086234 | 7/2011 |

OTHER PUBLICATIONS

U.S. Appl. No. 60/936,006, filed Jun. 14, 2007, Lundgren et al.
Pending claims of U.S. Appl. No. 14/273,801 dated May 20, 2015.
Pending claims of U.S. Appl. No. 14/485,896 dated May 20, 2015.
Pending claims of U.S. Appl. No. 14/269,552 dated May 20, 2015.
Pending claims of U.S. Appl. No. 14/126,674 dated May 20, 2015.
Pending claims of U.S. Appl. No. 14/127,081 dated May 20, 2015.
International Search Report for International Application No. PCT/US2011/066598 mailed Jun. 6, 2012 (8 pages).
International Written Opinion for International Application No. PCT/US2011/066598 mailed Jun. 6, 2012 (11 pages).

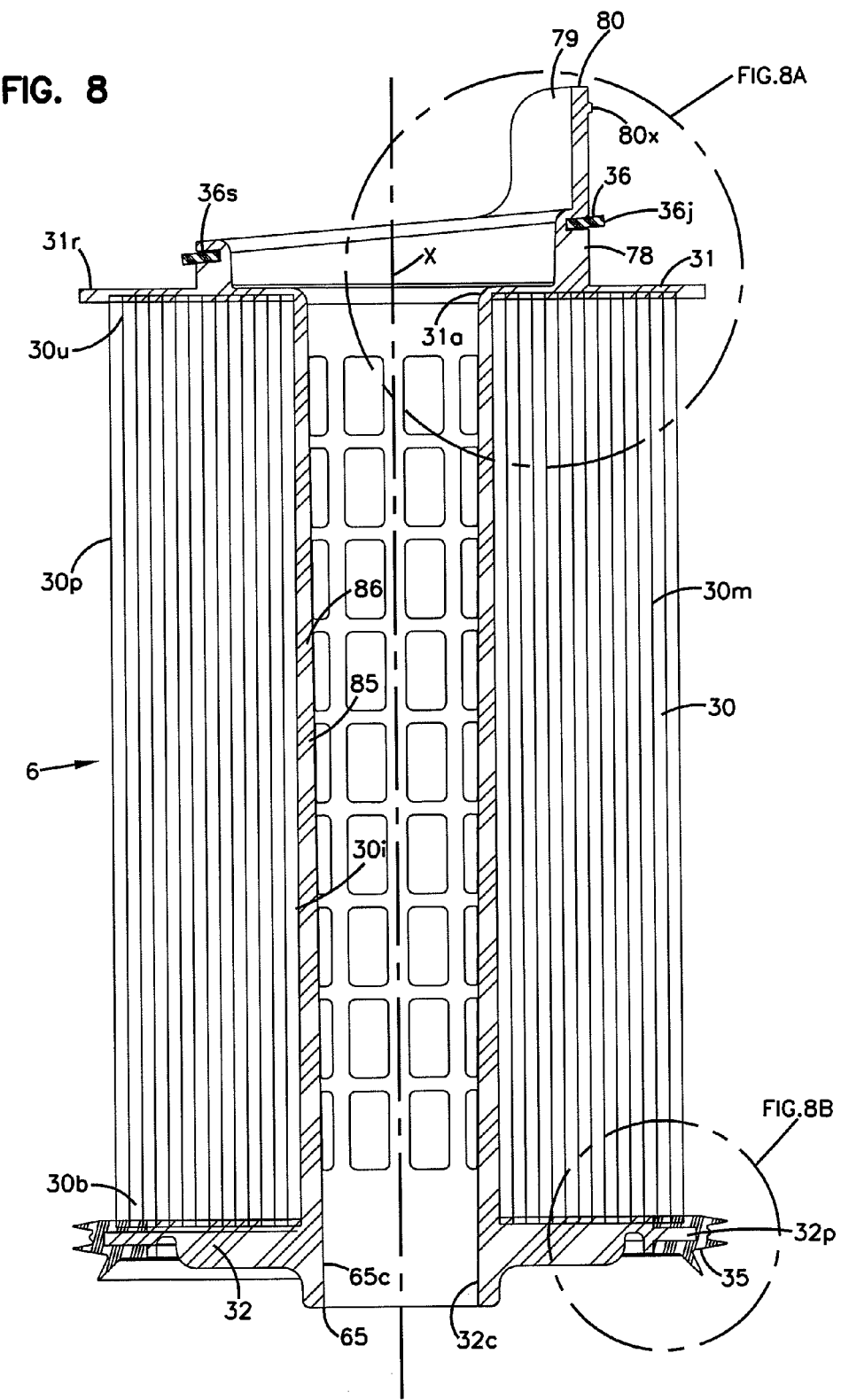

US 9,346,002 B2

CRANKCASE VENTILATION FILTER ASSEMBLY, COMPONENTS, AND METHODS

This application is being filed on 20 Jun. 2013, as a National Stage of PCT International Patent application No. PCT/US 2011/066598, filed 21 Dec. 2011 in the name of Donaldson Company, Inc., a U.S. national corporation, applicant for the designation of all countries except the US, and Christof Kleynen, a citizen of Belgium, applicant for the designation of the US only, and claims priority to U.S. Provisional Application Ser. No. 61/425,869, filed Dec. 22, 2010. PCT/US2011/066598 and US 61/425,869 are incorporated herein by reference. To the extent appropriate, a claim of priority is made to each of the above disclosed applications.

FIELD OF THE DISCLOSURE

The present application relates to systems, components and methods for separating hydrophobic fluids (such as oils) which are entrained as an aerosol, from gas streams (for example air streams). The arrangements also provide for filtration of other contaminants such as carbon particulates, from the gas streams. The arrangements are particularly useful to filter crankcase ventilation gases from engine systems.

The disclosure particularly concerns features and techniques for preferred construction of crankcase ventilation filter assemblies and components thereof. Methods of operation, assembly and use are also described.

BACKGROUND

Gas streams, such as engine crankcase blow-by gases (i.e., crankcase ventilation gases from the crankcases of diesel engines) carry substantial amounts of entrained oils (liquid) therein, as aerosol. In some instances, many of the oil (liquid) droplets within the aerosol are within a size range of 0.1-5.0 microns ($\mu$.). In addition, such gas streams also carry substantial amounts of fine particulate contaminants, such as carbon contaminants. Such contaminants often can have an average particle size with the range of about 0.5-3.0 microns ($\mu$.).

In some instances, it is desired to vent such gases back into an airflow inlet, for the engine system of concern. Such systems will generally be referred to herein as "closed," since the crankcase ventilation gases or engine blow-by gases are not vented to the atmosphere, but rather are retained within the system by being directed into the engine air intake for the system of concern. Typically, before such gases are directed to the engine intake system, they are cleaned of a substantial portion of the aerosol and organic particulate contaminants therein.

An example such assembly is described in PCT/US 2008/071783 filed Jul. 31, 2008, and published on Feb. 5, 2009 as WO 2009/018454, incorporated herein by reference. Other assemblies are described in WO 2008/115985, published Sep. 25, 2008; WO 2008/157251, published Dec. 24, 2008; and, WO 2007/053411, published May 10, 2007, each of which is incorporated herein by reference.

Typically, such assemblies comprise a crankcase ventilation filter assembly comprising a housing having: a gas flow inlet; a gas flow outlet; and, a liquid drain outlet. Within the assembly, a crankcase ventilation filter (or filter cartridge) is provided, through which the gases are directed in flowing from the gas flow inlet to the gas flow outlet. Within the filter or filter cartridge, liquid is coalesced and drained; the liquid being directed outwardly from the assembly through the liquid drain outlet. The filter or filter cartridge also removes at least a portion of solid particulates within the gases. The filtered gases can then be vented or be directed through the gas flow outlet and to an airflow inlet system for the equipment involved, for example into, or upstream from, an air cleaner.

In closed crankcase ventilation filter assemblies, sometimes a pressure regulator valve assembly is included within the crankcase ventilation filter assembly or otherwise in association therewith. The function and operation of the pressure regulator valve assembly (i.e. pressure control valve) is to regulate the assembly internal pressure, to within acceptable limits, in spite of varying pressure conditions for example at the crankcase ventilation filter assembly gas flow outlet or inlet. In furtherance of this, the regulator valve assembly can prevent excessive negative pressure in the assembly, for example that can be caused by an underpressure condition at the gas flow outlet of the crankcase ventilation filter assembly, being communicated back to the crankcase, i.e., through the crankcase ventilation filter assembly. A typical pressure control valve or pressure regulator valve assembly comprises a valve diaphragm biased against a spring, which closes or partially closes a gas stream through an outlet port of the crankcase ventilation filter system. For examples of such pressure regulation valves, see: WO 2009/018454; WO 2008/115985, WO 2008/157251 and WO 2007/053411, each incorporated herein by reference. Also, in U.S. provisional application 61/270,408, filed Jul. 7, 2009, an improved pressure regulation valve assembly and principles related thereto, are described. The U.S. provisional application 61/270,408 is also incorporated herein by reference in its entirety.

The present disclosure relates to improved crankcase ventilation filter assemblies and components thereof. The improvements relate to such factors as: convenience of manufacture, assembly and serviceability; and, convenient component feature and feature relationships for advantageous manufacture, servicing and/or operation. Methods and techniques of assembly, operation and use are also disclosed.

SUMMARY OF THE DISCLOSURE

BRIEF DESCRIPTION OF THE DRAWINGS

FIG. 8 is or enlarged, schematic, cross-sectional view of the filter cartridge component depicted in FIG. 7; the view of FIG. 8 being taken generally along line 8-8, FIG. 7.

DETAILED DESCRIPTION

I. The Example Assembly of FIGS. 1-24

In FIGS. 1-24, an example crankcase ventilation filter assembly including various features according to the present disclosure is depicted. Many of the features will be understood to be optional and preferred, when the crankcase ventilation filter is configured so that flow through a filter cartridge in use, is "out-to-in" for normal gas flow. The features can be adapted for use in arrangements which are alternately configured, and many of the features depicted can be modified and in some instances avoided, while taking advantage of selected principles characterized herein. Specifically, there is no requirement that a crankcase ventilation filter assembly or component thereof, include all of the features depicted, in order to obtain some benefit according to the present disclosure.

A. General Assembly, Operation and Example Features, FIGS. 1-6.

Figure 1:
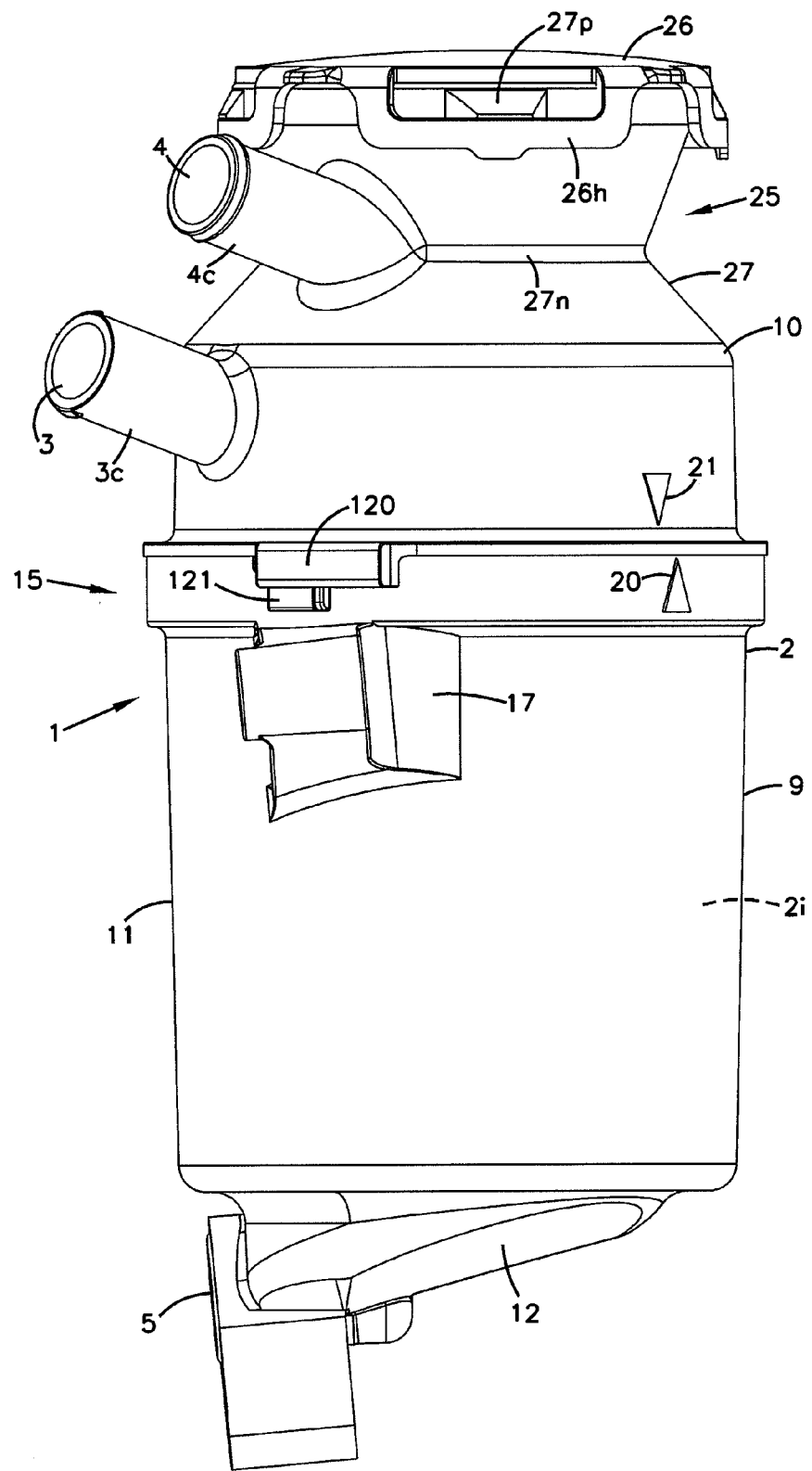
FIG. 1 is a schematic side elevational view of a crankcase ventilation filter assembly including features in accord with the present disclosure.

The reference numeral 1, FIG. 1, generally discloses an example crankcase ventilation filter assembly or arrangement according to the present disclosure. The crankcase ventilation filter assembly 1 includes a housing 2 having a gas flow inlet or inlet arrangement 3 and a gas flow outlet or outlet arrangement 4. There is no specific requirement that the gas flow inlet arrangement 3 and/or gas flow outlet arrangement 4 comprises a single aperture. However, in a typical application, each will be a single aperture surrounded by a conduit (3c, 4c, respectively) as depicted in the drawings. The terms "gas flow inlet" and "gas flow outlet", however, are not meant to be specific with respect to the number of apertures and/or the specific presence or absence of such a conduit.

The housing 2 further includes a (lower) liquid drain outlet or outlet arrangement 5. Similarly, the tem "liquid drain outlet" and variants thereof, is not meant to be specific as to the number of apertures and/or presence or absence of a conduit, unless otherwise specified.

In operation, crankcase gases, i.e., engine blow by gases (for example from a diesel engine) are directed in the gas flow inlet arrangement 3. Within an interior 2i of the housing 2, the gases are directed through a filter cartridge 6, not depicted in FIGS. 1-4, see FIGS. 5 and 6. Thus, as the gases are passed (in normal flow) from the gas flow inlet arrangement 3 to the gas flow outlet arrangement 4, they are directed through the cartridge 6. Within the cartridge 6, at least a portion of liquid (entrained within the gases) is coalesced and drained to the lower drain outlet arrangement 5 and outwardly from the housing 2. Within that same filter cartridge 6, particulate contaminant level is reduced in the gases. The filtered gases are then directed outwardly from the housing 2 through outlet arrangement 4. The gases can then be directed to a combustion air intake system for the equipment involved (for example to a location in, or upstream from, an engine air cleaner). When the gases are so directed, the crankcase ventilation filtration system 1 may be referred to as a "closed" crankcase ventilation (CCV) filter system. When the gases from outlet arrangement 4 are vented into the atmosphere, the crankcase ventilation gas filtration system 1 will sometimes be referred to as an "open" system or OCV.

In typical assemblies, the housing 2 is openable for service access to the interior 2i of the housing 2, for access to an internally received serviceable (i.e. removable) filter cartridge 6. Referring to FIG. 1, the example housing 2 comprises a housing bottom, base or base portion 9 and a removable top, cover (or service) assembly 10. In general, the top or cover assembly 10 is separable from the base 9, for service access to the housing interior 2i and the received cartridge 6. By the term "service access" and variants thereof in this context, reference is meant to separation of the cover assembly 10 from the housing 2 to provide access to interior 2i for removal of cartridge 6 and/or installation of a new or refurbished cartridge 6.

Still referring to FIG. 1, the base 9 includes: an outer sidewall 11; and, a bottom 12 that includes liquid drain arrangement 5 therein. In the particular assembly 1 depicted, bottom 12 is not separable from base 9. In alternative arrangements, principles analogous to those described in WO 2008/157251 can be applied, providing an arrangement in which bottom 12 is separable from the remainder of base 9.

Still referring to FIG. 1, at 15 a joint is provided, where access or cover assembly 10 is removeably secured to base 9. A variety of connection arrangements can be used at joint 15. A particular twist lock closure, with a cammed rotation lock arrangement, is used in the depicted assembly 1 depicted, to advantage. This is discussed further below in connection with FIGS. 18-24. It is noted, however, that a variety of alternate attachment mechanisms including threaded arrangements, latch arrangements and still other alternatives can be applied with certain ones of the selected principles described herein.

Referring still to FIG. 1, in normal operation, base 9 will be secured to the equipment with which the assembly 1 is to be used. Access cover 10 is typically removed, during service. Thus access cover 10 is typically not separately secured (from the base 9) to the equipment, except through attachment of various gas conduits, for example flexible hoses, to the inlet arrangement 3 and outlet arrangement 4.

Figure 2:
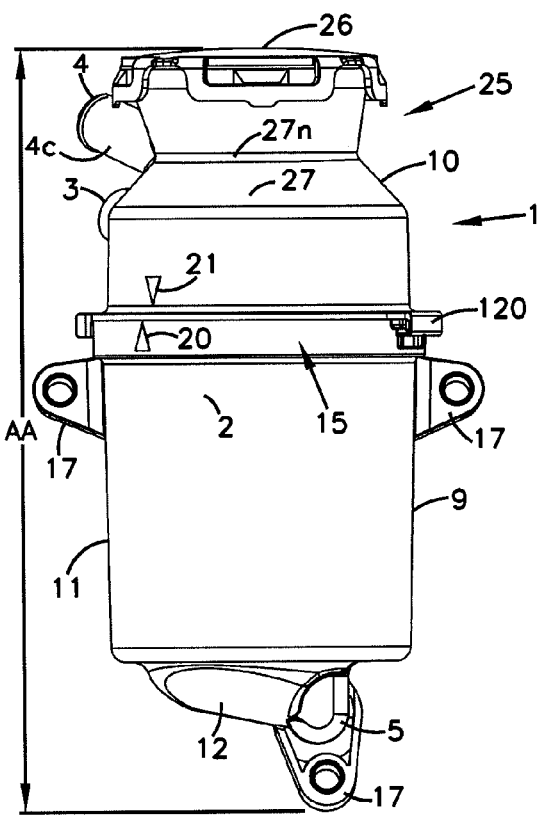
FIG. 2 is an alternate schematic side elevational view of the crankcase ventilation filter assembly of FIG. 1.

With respect to attachment of assembly 1 to equipment, attention is now directed to FIG. 2. In FIG. 2 mounting flanges 17 are shown positioned on base 9. The mounting flanges provide example preferred locations where bolts or other attachment mechanisms can be used to secure the base 9 to equipment for use.

Still referring to FIG. 2, it is noted that base 9, in the arrangement depicted, is a single, integral, molded plastic component, for example molded from glass filled nylon. Although this is advantageous, the base 9 can be alternately assembled, for example it can be made from an alternative plastic or metal. It can be made in more than one piece, if desired.

Herein, some example dimensions of a functional assembly are provided, although the principles can be practiced with alternate dimensions. In FIG. 2, an example total vertical height of the depicted example assembly 1 is indicated at dimension AA. In a typical example, dimension AA is 261 millimeters (mm), although alternatives are possible.

Still referring to FIG. 2, at joint 15 is depicted optional indicia 20, 21. Although alternatives are possible, for the particular assembly the indicia 20, 21 are positioned on base 9 and access cover 10, respectively, and are positioned such that when the indicia 20, 21 are in vertical alignment, the access cover 10 is locked and secured in a desired orientation on base 9, for operation of assembly 1. This will be discussed further below.

Still referring to FIG. 2, the access cover or cover assembly 10 comprises, in the example shown, a sidewall 25 that surrounds (positioned therein), a regulator valve assembly, discussed below. Assembly cover 26 is snap fit on remainder or remaining side structure 27 of the cover assembly 10, and provides for assembly for the internally received regulator valve assembly, as discussed below.

Figure 3:
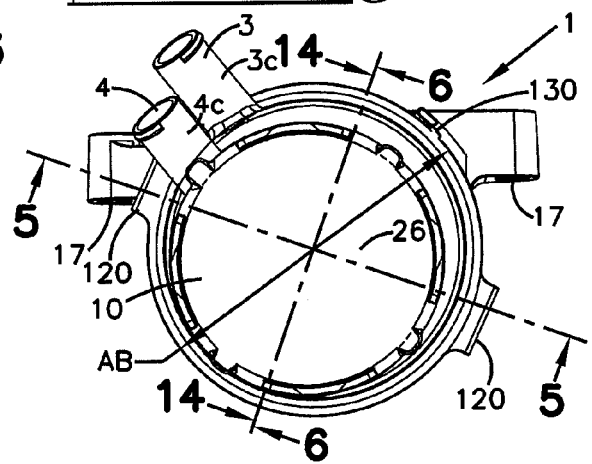
FIG. 3 is a schematic top plan view of the crankcase ventilation filter assembly depicted in FIGS. 1 and 2.
Figure 4:
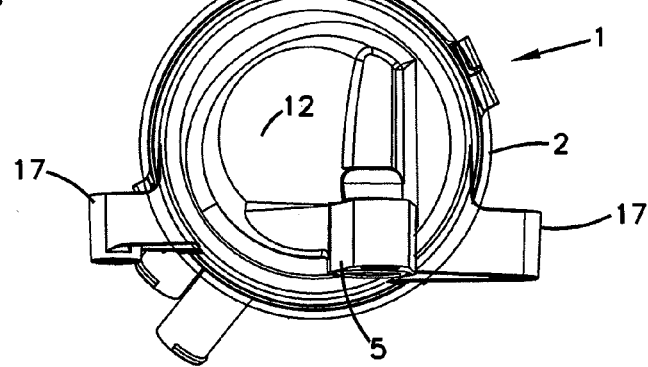
FIG. 4 is a schematic bottom plan view of the assembly depicted in FIGS. 1 and 2.

In FIG. 3, a top plan view of assembly 1 is depicted. In FIG. 3 a dimension for the example assembly is indicated at AB. For the example depicted, AB=114 mm. In FIG. 4, a bottom plan view of the assembly 1 is depicted.

Figure 5:
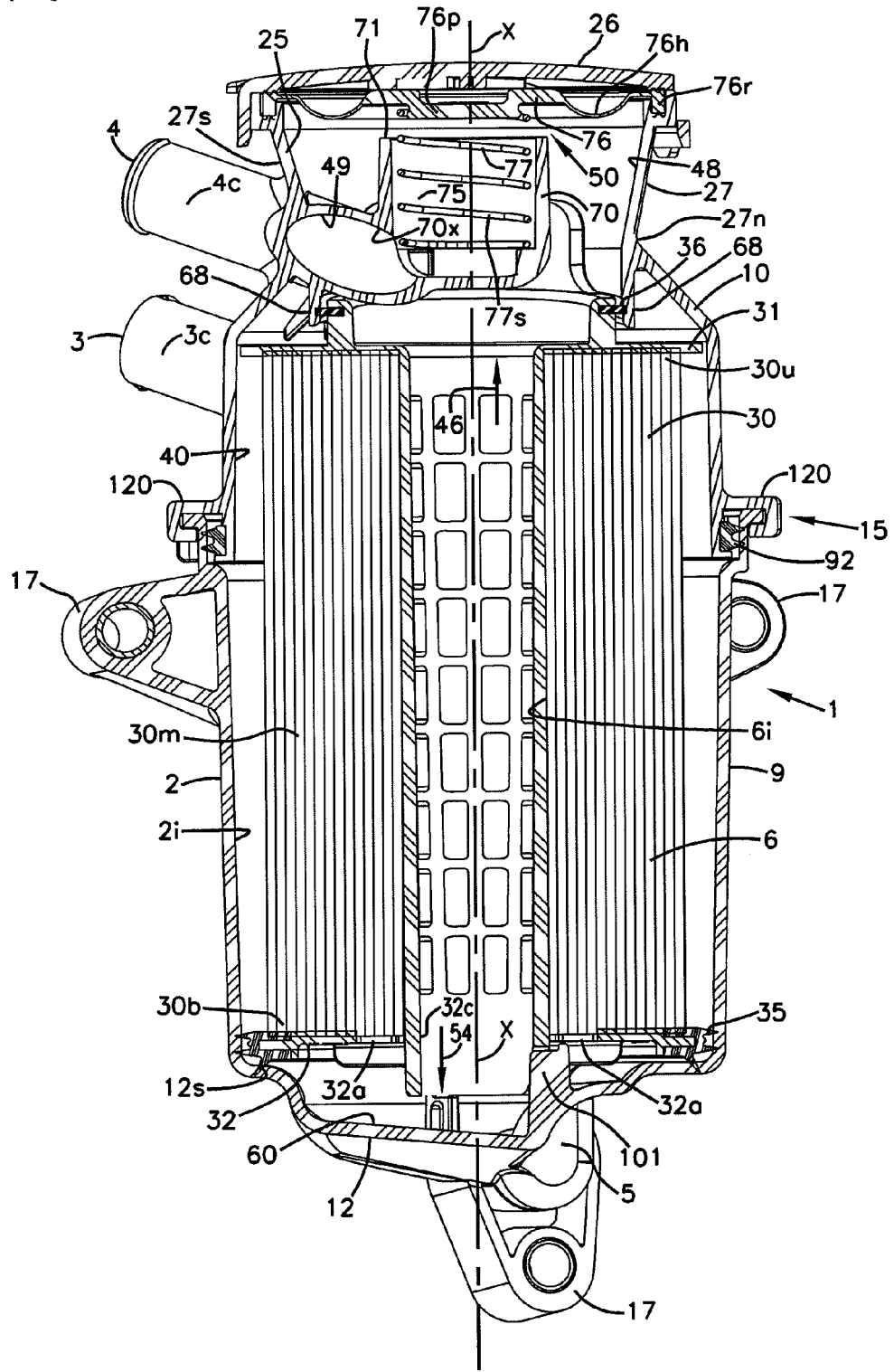
FIG. 5 is a schematic cross-sectional view of the assembly depicted in FIGS. 1 and 2; the cross-sectional view of FIG. 5 be taken generally along line 5-5, FIG. 3.
Figure 6:
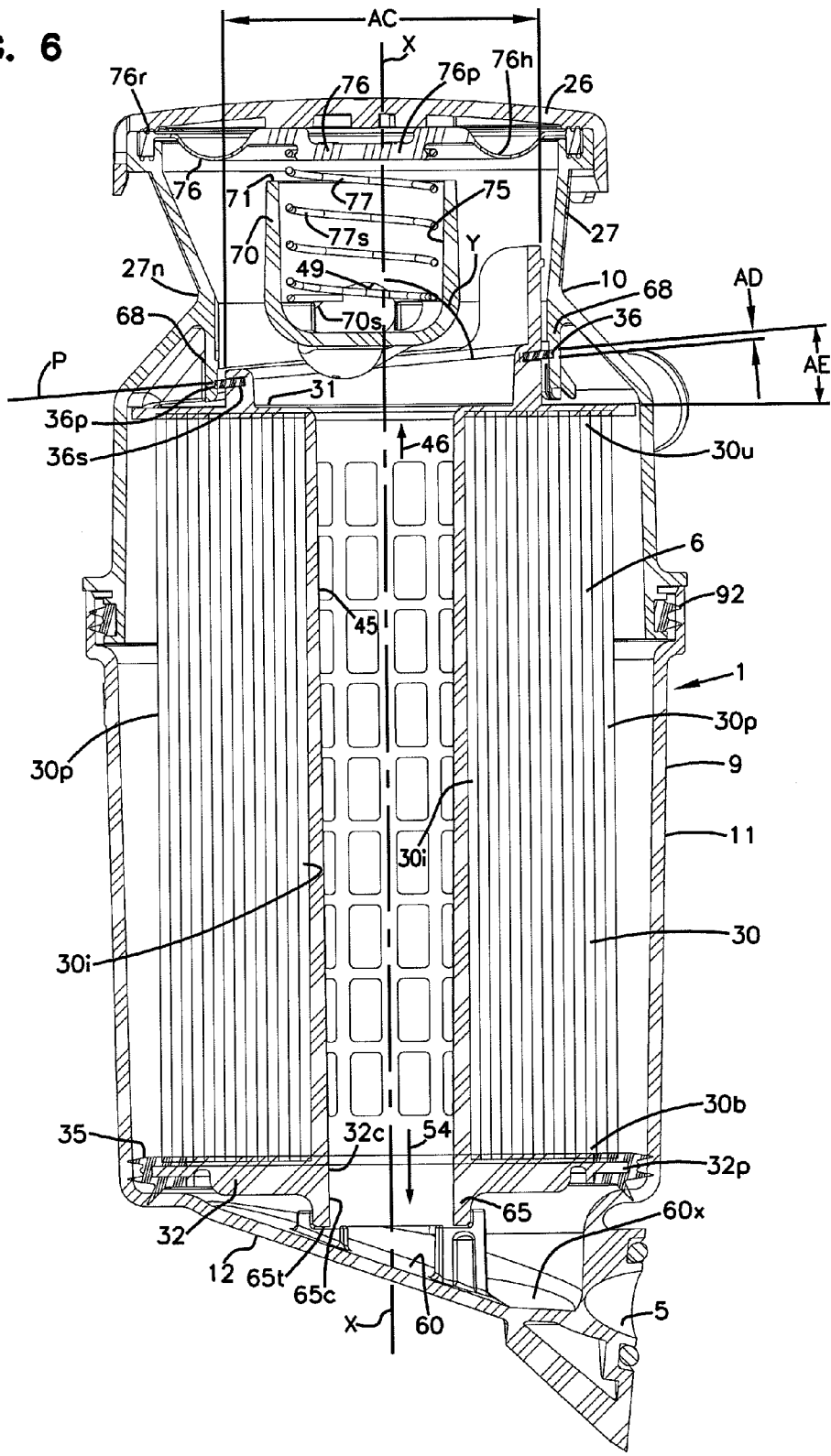
FIG. 6 is a second schematic cross-sectional view of the assembly depicted in FIGS. 1 and 2; the cross-sectional view of FIG. 6 being taken generally 6-6, FIG. 3.

In FIGS. 5 and 6, cross-sectional views of the assembly 1 are depicted, taken along line 5-5 and 6-6 respectively, of FIG. 3.

Referring to FIG. 5, attention is directed to internally received filter cartridge 6. The cartridge 6 comprises a media pack 30 (comprising media 30m positioned in extension between (first and second) opposite end pieces 31, 32). End piece 32 it is generally a lower or bottom end piece (in use), and is positioned adjacent a bottom end 30b of media 30m in use. The end piece 32 includes seal arrangement 35 thereon, positioned and configured to form a seal with base 9 when the cartridge 6 is installed.

End piece 31 is generally a top end piece (in use), and is positioned at upper end 30u of media 30m when cartridge 6 is installed for use. End piece 31 includes seal arrangement 36 thereon, configured to form a seal with housing 2, when cartridge 6 is properly installed for use.

Herein, when a feature location or orientation is defined as being "in use" reference is meant to a normal orientation when the assembly 1 is configured for operation, upon installation in equipment for which it is to be used. The orientation depicted in FIGS. 1 and 5 is a typical "in use" orientation.

In general terms, the cartridge 6 can comprise media 30m surrounding and defining an open cartridge interior 6i. The cartridge 6 is sometimes characterized as having a cartridge central axis X, defined by the surrounding media 30m. The cartridge central axis X is a longitudinal axis which extends through a center of the cartridge 6, i.e. longitudinally through an open interior 6i. When assembly 1 is configured for use, central axis X is typically oriented vertically or nearly vertically. Typically, the cartridge central axis X is also a housing central axis X.

Many of the principles characterized herein can be applied whether the cartridge 6 is configured for "in-to-out" flow during filtering; or, "out-to-in" flow during filtering. These terms are meant to refer to a direction of gas flow through the media 30m, during normal operation and filtering. It will be seen that the particular assembly 1 depicted in the drawings, is configured for "out-to-in" flow, with advantageous features associated with therewith. However, again, many of the features characterized can be applied to an assembly configured for a reverse flow direction, during normal operation.

Region 40, FIG. 5, is (generally) an internal region of housing 2, positioned exteriorly of cartridge 6 and between seal arrangements 35, 36. Region 40 is an inlet flow volume, for crankcase gases to be filtered, when the assembly is configured as depicted in FIG. 5. Thus, inlet arrangement 3 is configured to direct inlet gases into region 40, prior to passage into cartridge 6. When the assembly is configured as depicted in FIG. 5, region 40 can be characterized as an "annular" region or unfiltered gas flow "annulus", around cartridge 6.

After entering housing interior 2i and region 40, the gases are directed through media pack 30 (and media 30m) to open filter interior 6i. The filtered gases are then passed upwardly in the direction of arrow 46 into upper volume 48 of housing 2. The gases are eventually directed through outlet opening 49 and into gas flow outlet arrangement 4, to exit the assembly 1. In general, volume 48 is positioned above seal 36, and is isolated from region 40 by seal 36. It is noted that in passing from cartridge 6 to aperture 49, for the particular assembly 1 depicted, the gases are directed through regulator valve assembly 50, generally referenced above. The regulator valve assembly 50, discussed in detail below, provides for regulation of gas flow to the aperture 49 and outlet 4 in a manner as discussed below.

As referenced above, within media pack 30 of cartridge 6, coalescing of liquid carried within the gases will occur. This can develop a liquid head (within media 30m) of liquid that needs to drain from the cartridge 6. In the example depicted, the liquid can drain via several paths, as follows, although alternatives are possible.

For example, some of the liquid can flow into interior 6i and drain downwardly by gravity in the direction of arrow 54 through a center aperture or opening 32c in bottom end piece 32. Some of the liquid can also drain directly downwardly from bottom end 30b of the media 30m without passage into interior 6i; for example, through bottom drain aperture arrangement 32a through end piece 32, as discussed below. This latter type of "bottom drain" is generally described in such publications as WO 2009/018454 and WO 2007/053411; each being incorporated herein by reference.

Regardless of the specific drain path of the liquid, in general the assembly 1 is configured so that liquid drains by gravity to region or volume 60 which comprises a bottom volume in housing 2, below seal arrangement 35. Volume 60, for the example assembly 1 depicted, is positioned on bottom 12. Bottom 12, for the example depicted, is configured to have a slanted shape to funnel collected liquid toward drain 5, FIG. 1.

Referring now to FIG. 6, an alternate cross-sectional view of the assembly 1 from FIG. 5, attention is directed to region 60. At 60x entrance to outlet 5, FIG. 1, is depicted. Referring to FIGS. 5 and 6, it can be seen that for the example assembly 1 depicted, the lower drain 5 and the entrance 60x thereto, are positioned "eccentrically" in bottom 12. By "eccentrically" and variants thereof in this context, it is meant that the drain outlet 5 and entrance 60x thereto are not positioned in a center of bottom 12, i.e. are not centrally intersected by central axis X. Rather, entrance 60x and outlet 5 are offset from center axis X. Thus, a lower internal shape of base 9, while generally configured to funnel liquid toward entrance 60x, is not a central circular funnel, but rather is an offset or eccentric funnel. Indeed, entrance 60x is not even intersected by axis X in the example depicted. This configuration is particularly advantageous for the assembly 1 depicted, with respect to what is expected to be a typical intended mount in use. Alternatives, however, including arrangements with a central circular funnel shape, are possible.

Still referring to FIG. 6, projecting downwardly (in use) from bottom end piece 32 is provided central projection 65. The central projection 65 defines an internal conduit 65c downwardly through which liquid that reaches central open interior 45 can drain, when the assembly 1 is configured as shown, for out-to-in flow through the cartridge 6 during normal use. Further, for the example assembly 1 depicted, the particular projection 65 depicted is configured to engage the housing bottom 12 in a preferred manner that: rotationally orients the cartridge 6 within the housing base 9; and, prevents cartridge 6 from rotating during servicing, in manners discussed further below.

For the example cartridge 6 depicted, the projection 65 is preferably positioned spaced radially inwardly from an outer perimeter 32p of the lower end piece 32, and is preferably positioned so that conduit 65c is spaced radially inwardly from an inner perimeter 30i of the media 30m. (It is noted that conduit 65c surrounds and defines central aperture 32c referenced above).

By the characterization that conduit 65c is spaced radially inwardly from an inner perimeter 30i of the media 30m, it is meant that the conduit 65c is not overlapped by the media 30m. In general, the conduit 65c is positioned, in use, to extend lower than the media 30m, within the assembly 1, i.e. a lower most tip 65t of the projection 65 is not surrounded by the media 30m, but rather extends (projects) below a remainder of the cartridge 6.

In more general terms, preferably a cross-sectional dimension of conduit 65c is smaller than a dimension across the cartridge 6 (and perpendicular to central axis X) that corresponds to a cross-sectional dimension of an outer perimeter 30p of the media 30m. Preferably, a cross-sectional dimension of conduit 65c is no larger than (and preferably is smaller than) a dimension across a space measured perpendicularly to central axis X across a perimeter sized half-way (50%) across the thickness of the media 30m from the media inner perimeter 30i to the media outer perimeter 30p; that is, a dimension across conduit 65c is preferably no greater than a perimeter definition of a media pack that is half as thick as media 30m, with the same inner perimeter 30i. Preferably, a dimension across conduit 65c is no greater than a dimension across media 30m having the same inner perimeter 30i as media 30m, but having a thickness no more than 20% of a thickness of media 30m. Indeed, most preferably, a dimension across conduit 65c is no larger than (and preferably is smaller than) a dimension across an inner perimeter 30i of the media 30m and preferably the dimension across conduit 65c is smaller than an internal perimeter 30i of the media 30m, as shown.

The projection 65 preferably extends downwardly from end piece 32, in use, less than a distance that would extend completely to a lower most portion of bottom 12. Typically, the amount of this extension is at least 3 mm and not more than 15 mm, although alternatives are possible. In this manner the projection 65 does not block liquid flow running along bottom 12, to outlet 5. Other preferred features of projection 65 will be understood from further detailed discussion below.

Attention is again directed to seal arrangement 36, FIG. 6. Seal arrangement 36 generally comprises seal member 36s positioned to form a seal with the surrounding portion or seal collar 68 of cover assembly 10. Preferably, seal member 36s is configured to form an outwardly directed radial seal as shown. By the term "outwardly directed radial seal" and variants thereof when used in this context, it is meant that the seal member 36s forms a seal directed against a surface, of a surrounding seal collar 68 in the housing 2, that is directed toward axis X.

Referring to FIG. 6, the seal member 36s in the example depicted is positioned to define an outer seal perimeter 36p that generally defines a plane P (or seal plane) that extends at an angle non-orthogonal to central axis X of the cartridge 30. Typically the (smallest) acute angle of intersection, indicated generally at Y, FIG. 6, is no greater than 89°, usually no greater than 87°, typically no less than 80° and usually no less than 83°. That is, typically the smallest acute angle of intersection is within the range of 80°-89°, inclusive, typically within the range of 83°-87°, inclusive. The term "acute angle of intersection" and variants thereof, as used in this context herein, is meant to refer to the smallest angle of intersection between the plane P and the central axis X. At AE FIG. 6, an angle of intersection between a plane defined by the seal 36s and a plane orthogonal to the central axis X, for the example depicted, is shown, with AE=5°. This would correspond to an acute angle of intersection Y of 85°. With reference to the seal plane P, it is noted that the seal 36s may distort (when installed) out of planar. The reference to a seal plane P is meant to be a reference to a theoretical or hypothetical plane that assumes the seal maintains an undistorted configuration, and follows that undistorted configuration.

It is noted that for the particular example cartridge depicted, as will be typical for a cartridge configured for use in an assembly in accord with preferred aspects of the present disclosure, no portion of the seal 36s surrounds any portion of the media 30m but rather seal 36s is positioned entirely above media 30m. Alternately stated, media 30m does not intersect the region surrounded by seal 36s. Some applications according to the present disclosure could be applied in alternate systems, but this will be typical.

Referring to FIGS. 1 and 5, it is noted that the seal 36s separates regions interiorly of housing 2 in direct flow communication with inlet 3 and outlet 4. That is, the assembly 1 is configured so that gases which enter inlet 3 preferably pass through the media pack 30 (and media 30m) before they can exit the assembly 1 through the outlet 4. To accommodate this, the seal plane of seal 36s, then, separates regions 48 and 40. The "slant" to the seal can be used to accommodate a variety of selected geometric locations for the inlet 4 and outlet 3 while accommodating additional structural features within the housing 1. For the particular assembly depicted, it will be preferred that the cartridge 6 be configured in so that only a single selected rotational orientation, relative to base 9 and around axis X, is possible.

As referenced above, the assembly 1 includes an internal regulator valve assembly arrangement 50. In general, the regulator valve assembly 50 comprises an internally positioned receiver 70 having an upper edge 71. To reach outlet opening 49, gas flow from cartridge 6 must pass around receiver 70 and over end 71 into interior 75 to receiver 70. At 70x the opening from receiver interior 75 to outlet opening 49 is depicted. In general, again, interior 75 and outlet 49 are isolated from region 40, by seal 36s.

The regulator valve assembly 50 (FIGS. 5 and 6) includes a valve member or diaphragm 76 secured under cover 26 and supported over end 71 by biasing arrangement 77, in this example comprising coiled spring 77s. The biasing arrangement 77 will control an amount of open volume between valve member 76 and tip 71, regulating flow through assembly 1 to outlet 4. In general, the valve member 76 will tend to be drawn against biasing spring 77s to reduce flow over edge 71, or will be pushed maximally away from edge 71, opening receiver 70 to receive gas flow, depending on pressure/vacuum conditions in the assembly 1 and the characteristics of spring 77s. Such regulator valves have previously been used in crankcase ventilation filter assemblies including those described in WO 2009/018454. In general, valve member 76 includes a central plug 76p surrounding by rolling hinge 76h with an outer perimeter rim 76r secured between cover 26 and sidewall 27.

From the above, general operation of assembly 1 will be understood. Crankcase ventilation gases are directed into assembly 1 through inlet 3, and into interior volume 40. The gas is passed through the cartridge 6; in particular through media pack 30, into open central region 45. The filtered gas is then passed upwardly in the direction of arrow 46 around receiver 70 and over edge 71, into interior 75 of receiver 70. The gases are passed through opening 70x at outlet opening 49 to outlet 4, where they are directed, for example, to an engine air intake for an internal combustion engine. Within the media 30m, coalesced liquid will form, and build up a liquid head. The liquid will tend to drain downwardly through bottom drain apertures 32a around projection 65, to outlet 5. Any liquid which flows through media 30m and reaches interior 45 will tend to drain downwardly in the direction of arrow 54 through projection 65, again to bottom 60 and outlet 5.

Periodically, should the media 30m become sufficiently occluded to effect desirable operation, access cover 10 can be removed from base 9, cartridge 6 can be removed and be either be refurbished or be replaced by a new cartridge 6, and then cover assembly 10 can be repositioned for operation.

In FIG. 6, dimension AC is indicated. In the example assembly depicted AC=59.6 mm.

It is again noted that the assembly features thus far described are characterized in the context of a cartridge 6 configured for operation with filtering flow through the media pack 30 thereof, in an out-to-in pattern, during filtering. Many of the principles described can be alternatively positioned in an arrangement in which the gas flows oppositely through the filter, media, i.e. in-to-out. With such arrangements it is important to insure that the liquid drain occurs appropriately relative to any seal that control or contain gas flow. Thus an alternate sealing arrangement would be preferable with such a "reverse" in flow of gas. Certain of the principles described for example in WO 2008/115985 can be used to accommodate this.

B. The Filter Cartridge 6, FIGS. 7-10.

Attention is now directed to FIGS. 7-10, in which cartridge 6 is depicted in detail. Attention is first directed to FIG. 7, a side elevational view of cartridge 6.

Figure 9:
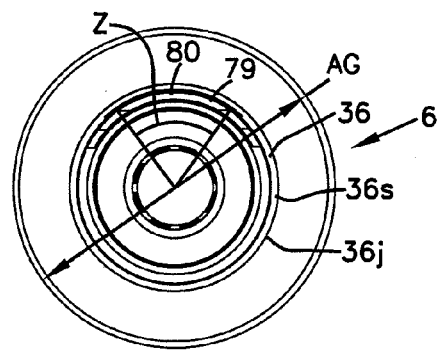
FIG. 9 is a schematic top plan view of the filter cartridge component of FIG. 7.

Media pack 30, and media 30m, can be seen positioned between end pieces 31, 32. Projection 78 on end piece 31 can be seen projecting away from media pack 30 and end piece 32. The projection 78 provides a support around which seal member 36s is positioned. On an opposite side of seal member 36s from end piece 31, projection 78 includes a handle member 79, to facilitate handling of the cartridge 6 during installation or removal. The handle member 79 for the assembly depicted, comprises an upper rail or edge 80 which is arcuate, but does not extend completely around a circle. A typical upper rail or edge 80 will extend between ends positioned spaced by a radial arc of at least 5° typically within the range of 5°-80°, usually 10°-45°, inclusive, around central axis X. By this it is not meant to be suggested, however, that edge rail 80 is necessarily configured (continuously) to a circular arc. In FIG. 9, the arcuate extension of rail 80 is shown at angle Z.

The handle member 79 can optionally include an aperture or aperture arrangement therethrough at a location underneath the rail 80, if desired, to facilitate handling. The particular handle member 79 depicted does not include such an aperture however.

Figure 7:
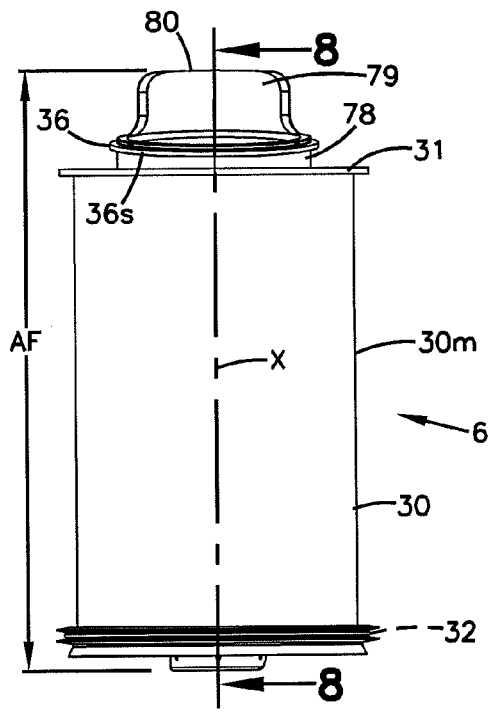
FIG. 7 is a schematic side elevational view of a filter cartridge component of the assembly depicted in FIGS. 1 and 2.

In FIG. 7, an example dimension for the example assembly depicted is indicated at AF is 186 mm.

Attention is now directed to FIG. 8, a cross-sectional view taken along line 8-8, FIG. 7.

Referring to FIG. 8, it can be seen that the preferred cartridge 6 comprises a media pack 30 comprising media 30m positioned on a cartridge frame piece 85 which also has, mounted thereon, seals 35 and 36.

The particular media 30m depicted, is shown as a multiple layered media 30m comprising media coiled in a cylindrical form, though alternate media configurations are possible. An example usable media for media 30m is media in accord with WO 2006/084282, published Aug. 10, 2006; and/or as described in the other above incorporated references.

Referring to FIG. 8, the frame 85 can be seen as comprising central core 86 in extension between end pieces 31, 32. End piece 31 can be seen as comprising a ring arrangement 31r positioned in an overlap with upper end 30u of media 30m; and, projection 78. Projection 78 is shown extending away from media 30m and end piece 32. Projection 78 is shown positioned to support the seal 36 at a seal perimeter which is smaller than an outer perimeter 30p of the media pack 30 and which is also larger than an inner perimeter 30i of the media pack 30. Herein, reference will sometimes be made to a perimeter of the seal member 36s "in projection." This is meant to refer to a projection into a plane perpendicular to central axis X. Such a projection perimeter to the seal 36 is shown in FIG. 9, at 36j.

Referring to FIG. 9, it can be seen that for the particular cartridge 6 depicted, the seal 36 (seal member 36s) in projection 36j forms a circular (perimeter) projection definition 36j. This will be typical for many embodiments according to the present disclosure.

Also, comparing FIG. 7-9, the projection perimeter 36j is positioned in overlap with the media pack 30 at a location between the inner perimeter 30i and the outer perimeter 30p of the media. This too will be typical. Indeed, preferably the projection perimeter 36j, is located in overlap with the media 30 at a location at least 10% of a thickness of the media 30m: inwardly from the outer perimeter 30p and also outwardly from the inner perimeter 30i; preferably at least 20% of the thickness of the media 30m from each of the inner perimeter 30i and outer perimeter 30p, usually at least 30% (and, most preferably 30-70%, inclusive) of this distance.

Figure 8A:
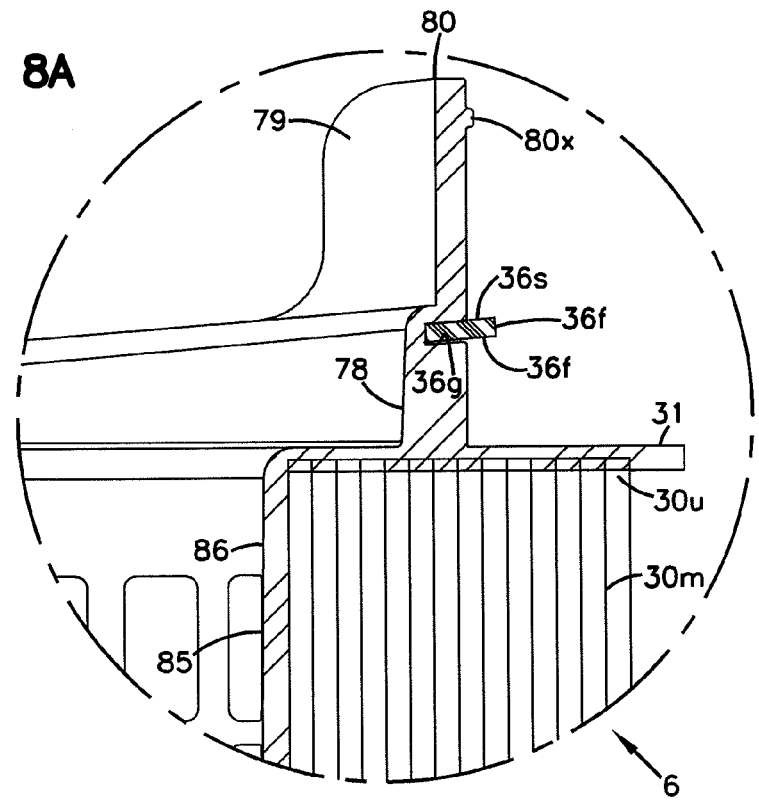
FIG. 8A is an enlarged fragmentary schematic view of a first identified portion of FIG. 8.

In FIG. 8A, an enlarge fragmentary view of a portion of FIG. 8 is provided. Seal member 36s can be seen as comprising a disk of seal material, with a rectangular cross-section as opposed to a circular cross-section of an o-ring, although an o-ring can, alternatively, be used in some applications. Referring to FIG. 8A, the particular seal member 36s depicted, is shown positioned received within a receiving groove 36g that extends around support 78. The free end 36f of the seal 36s is a portion that projects outwardly from (i.e. externally of) the groove 36g.

Typically, a substantially rectangular cross-section such as shown in FIGS. 8 and 8A are preferred for the seal 36, with a free end (indicated generally at 36f, FIG. 8A) that is at least 1 mm long, typically 2-5 mm long, (often not more than 4 mm long) in free extension outwardly from groove 36g in support 78, and which is also at least 1 mm thick, typically 1-3 mm thick, usually 1-2 mm thick. In FIG. 6, this thickness is indicated at dimension AD and is 1.5 mm, for the example depicted. Typically, the free end 36f is longer in extension outwardly from groove 36g in projection 78, than it is thick. This will provide seal member 36s with a free end 36f that deflects somewhat, to facilitate installation and sealing, while taking up tolerance variations. It also may require less stress to establish a seal, than a comparable o-ring, which can be convenient. It is also a convenient structure for use as a seal 36s around which a sealing collar is positioned that does rotate around axis X at least partially during assembly, as discussed below.

The seal 36s can be secured within groove 36g, with an adhesive if desired. However, there is no specific requirement that an adhesive be used at this location, or that seal 36s not be able to rotate relative to projection 78. Typically, the seal 36s will be made of Viton (rubber) or a similar material and will not be adhered in place with adhesive.

Media end 30u can be adhered to end piece 31 if desired, for example by using an adhesive. However, a tight fit will be adequate in many instances. In FIG. 8A, some interference between the media 30m at end 30u and end piece 31 is suggested. Actual interference will not be typical, and the overlap is meant to indicate that the media/end piece interface is preferably tight. Indeed, typically, a tight line-to-line fit, that may compress or deflect the media 30m slightly, at the interface, will be used. Similar observations can be made with respect to FIG. 8B, between lower end 30b of the media 30m and end piece 32. Again, an interference fit is suggested, but typically a tight line-to-line fit will be used.

Referring again to FIG. 8, end piece 31 can be seen as having a central aperture 31a extending there through, into interior conduit 86. The conduit 86 is generally porous, allowing gas flow and liquid flow therethrough.

Figure 8B:
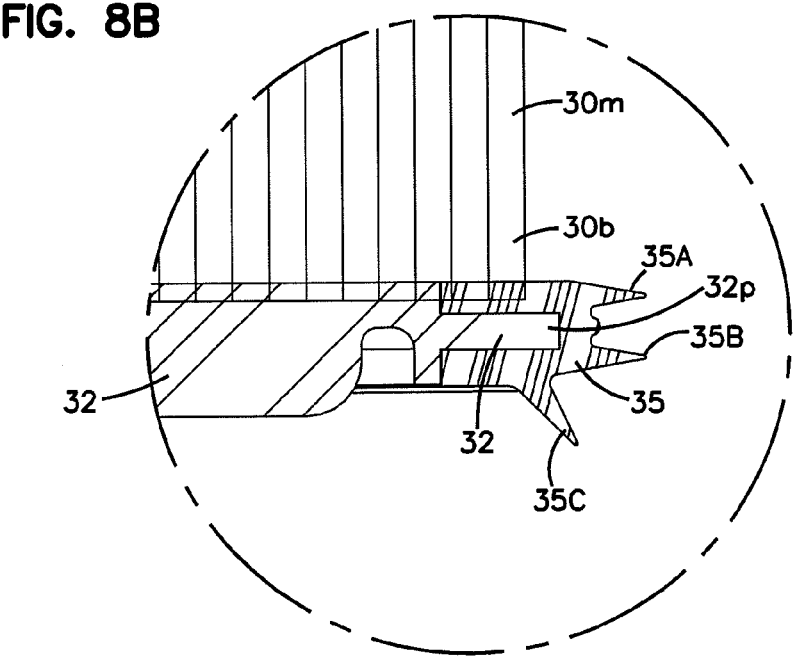
FIG. 8B is an enlarged fragmentary schematic view of a second identified portion of FIG. 8.

Attention is now directed, in FIG. 8, to end piece 32. End piece 32 has an outer perimeter 32p on which is positioned seal member 35. Referring to FIG. 8B, an enlarged fragmentary view of a portion of FIG. 8, the seal member 35 can be seen as comprising a seal member formed to have a three lips indicated at 35A, 35B and 35C respectively. Although alternative seal configurations are possible, including an o-ring, the arrangement of having three lips 35A, 35B, 35C can be advantageous. Lips 35A and 35B are (generally) spaced radial, lips directed radially outwardly from central axis X to form a dual lip (radial) seal with a surrounding lower portion of outer sidewall 11, of the housing base 9, as shown in FIG. 5. Lip 35c, on the other hand, is generally directed diagonally downwardly and outwardly away from central axis X and end piece 32, to engage a lower, radially inwardly directed, shoulder 12s in housing bottom 12, FIG. 5. This will help manage liquid flow within region 60. Seal arrangement 35 can be preformed, for example molded, and then be positioned (and secured) on perimeter 32p of end piece 32. It can alternatively be molded-in-place. In a typical example, seal 35 is molded from an AEM rubber (ethylene acrylic elastomer).

Referring to FIG. 8, end piece 32 is formed with central opening 32c therein, in flow communication with conduit 86 to allow liquid flow there through into region 60, FIG. 1. Surrounding aperture 32c is provided projection 65 referenced above; projection 65 extending away from media 30m and end piece 31.

Figure 10:
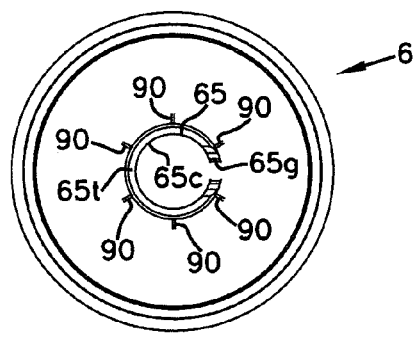
FIG. 10 is a schematic bottom plan view of the filter cartridge component depicted in FIG. 7.

Referring now to FIG. 10, a bottom plan view of cartridge 6, a perimeter shape of projection 65 can be seen in detail. The particular projection 65 depicted, is generally configured on a circular arc with an end or tip 65t having a gap 65g therein, although a variety of alternative configurations are possible. Most preferably projection 65 is not merely a continuous circular projection at tip 65t. The reason for this is that preferably projection 65 is configured to provide for both: anti-rotation lock; and, rotational alignment or orientation of the cartridge 6 within the housing 1. The particular gap 65g depicted, is a receiver gap that provides for a cartridge-to-housing base rotational alignment or orientation arrangement, through use of a projection/receiver engagement arrangement discussed further herein below.

Still referring to FIG. 10, surrounding projection 65 are shown spaced apertures 90 which extend through end piece 32. Apertures 90 are drain apertures, corresponding to apertures 32a, FIG. 5, that form a bottom drain arrangement. These apertures 90 allow direct liquid flow downwardly from the media 30m through end piece 32, when the liquid head is sufficiently high. Thus, not all liquid coalesced within the media pack 30 must pass into central aperture 45, FIG. 1 to drain.

Herein above in connection with FIG. 9, an example outer diameter AG was indicated, with AG=99 mm, for the example depicted.

Figure 11:
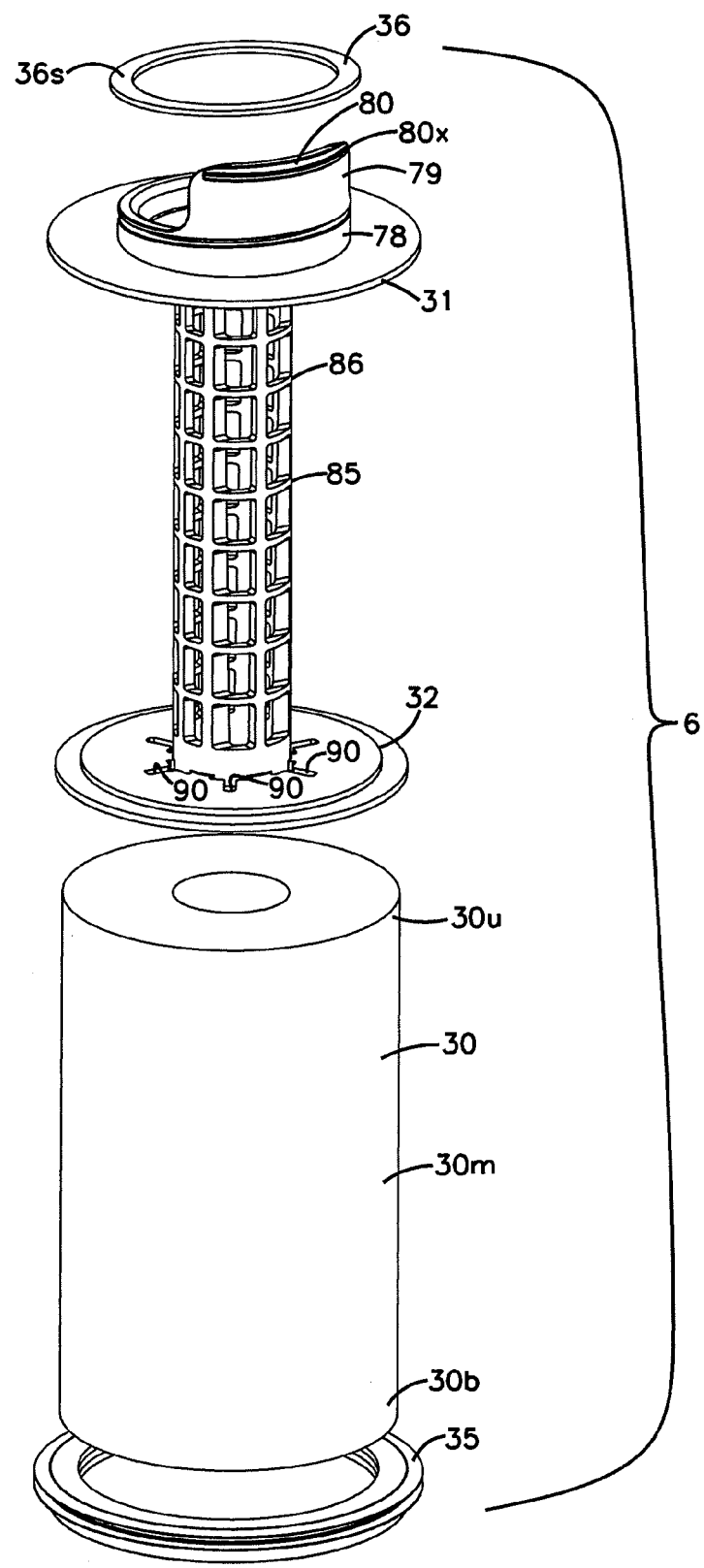
FIG. 11 is a schematic exploded top perspective view of the filter cartridge component depicted in FIG. 7.

Attention is now directed to FIG. 11, an exploded perspective view of cartridge 6. Seal members 35 of 36s can be seen, as well as media 30m and frame piece 85. It can be seen that frame piece 85 can be configured as a single integrally molded piece comprising: central conduit 86; and, end pieces 31, 32 with projections thereon respectively. By the term "single integrally molded piece" in this context, it is meant that the piece be molded from plastic as a single structure. In FIG. 11, a rib 80× to facilitate grasping the handle 79 is shown.

A. The Housing 2, FIGS. 12-17

1. Cover Assembly 10, FIGS. 12 and 14.

Figure 12:
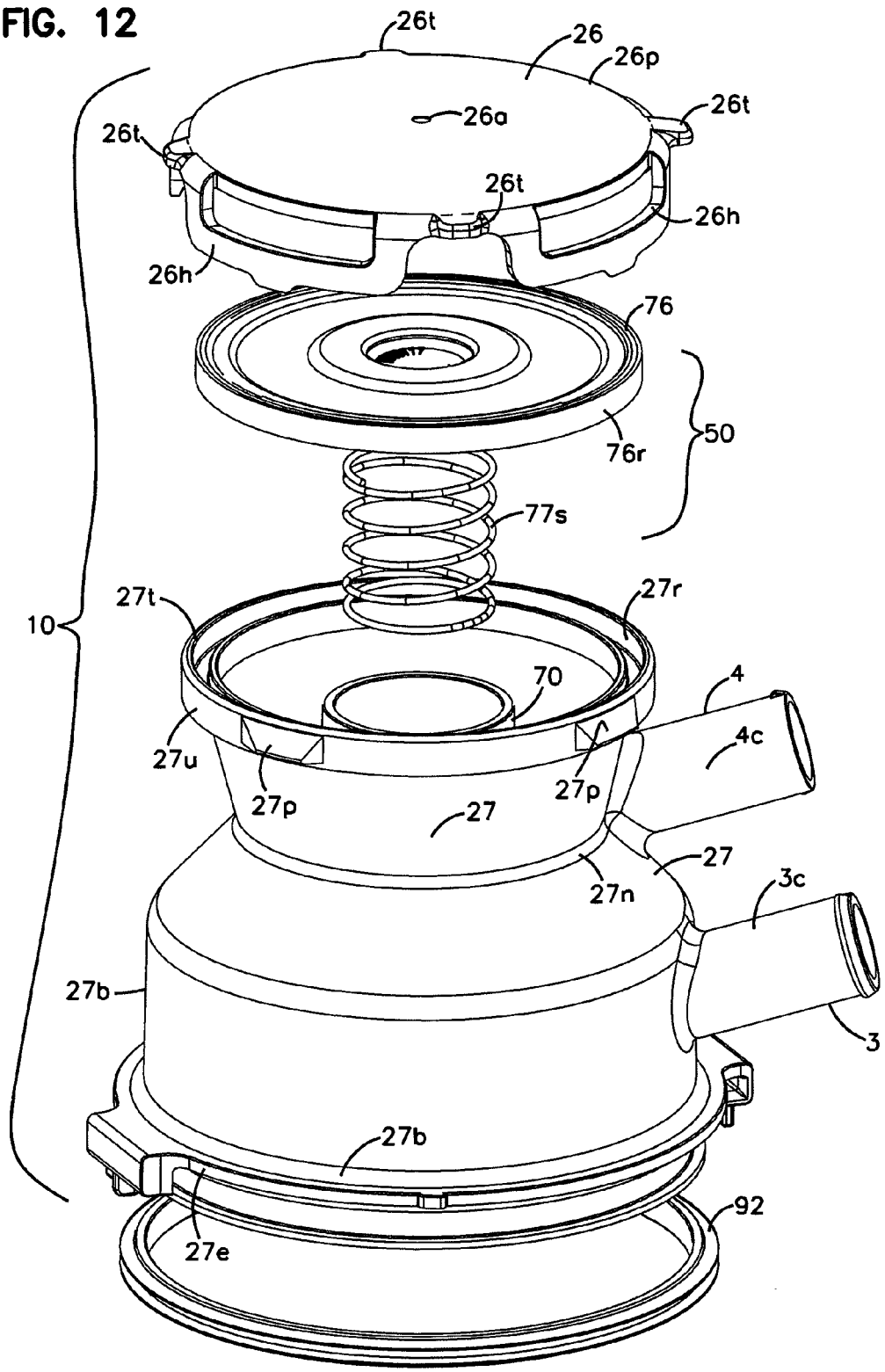
FIG. 12 is a schematic exploded top perspective view of a cover and regulator valve assembly of the crankcase ventilation filter assembly depicted in FIGS. 1 and 2.

In FIG. 12, an exploded perspective view of cover assembly 10 is depicted. Viewable are: sidewall 27, with inlet 3 and outlet 4; internal receiver 70; regulator valve arrangement 50, comprising coiled spring 77s and valve member 76; and, top 26. Also viewable is gasket 92 which, in use, is generally positioned to provide a seal between cover assembly 10 and base 9, when housing 1 is assembled. This will be understood from a review of FIG. 14. The depiction of gasket 92 in FIG. 12, is not meant to suggest that the gasket 92 forms a part of the cover assembly 10. Rather, it is depicted for completeness and understanding of orientation.

Figure 14:
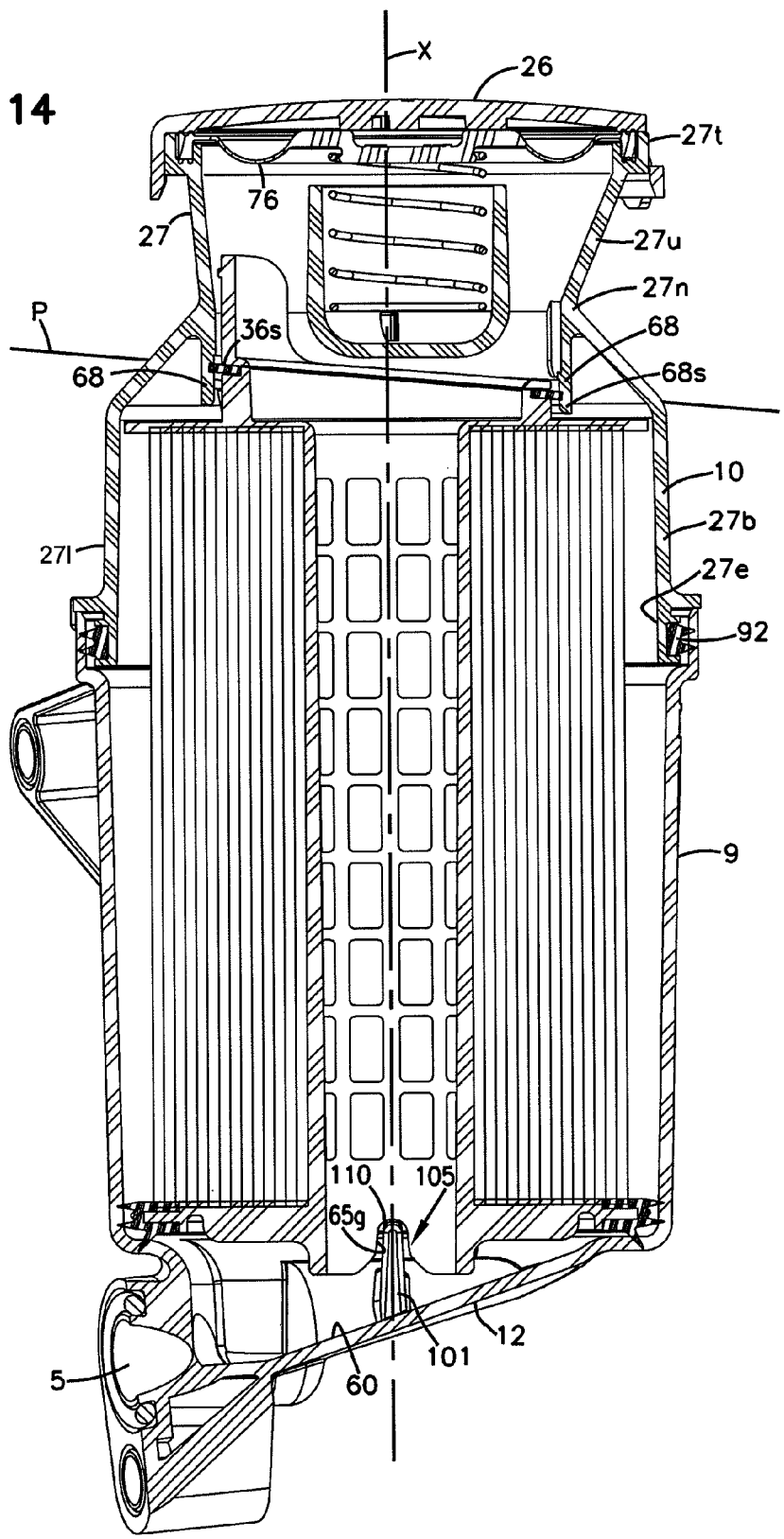
FIG. 14 is a third schematic cross-sectional view of the crankcase ventilation filter assembly taken generally along line 14-14, FIG. 3.

Referring to FIGS. 12 and 14, sidewall structure or section 27 can generally be characterized as defining: upper region 27u, lower region 27b and a central, narrowed neck, region 27n. The upper region 27u extends between the narrow most portion of the neck 27n and a top end 27t of the sidewall section 27. Lower end 27b defines a bottom end 27e of sidewall section 27. Generally the bottom end 27e is positioned where the sidewall 25 (and section 27) engages base 9 in assembly. The top end 27t, FIG. 12, is positioned where cover 26 engages sidewall section 27. End 27t surrounds a receiver trough 27r, in which a rim 76r of the diaphragm 76 is positioned, to be secured between the top cover 26 and sidewall section 27 during assembly.

Referring to FIG. 14, neck 27n is a narrow perimeter side portion of sidewall section 27 positioned between top 27t and bottom 27b. In the example depicted, and although alternatives are possible, internally of cover assembly 10, depending downwardly from neck 27n is provided seal collar 68, which defines an inner radial surface 68s against which seal member 36s forms a seal, when cartridge 6 is installed for use.

The narrowed neck 27n provides a number of advantages. First, it provides for a convenient location for mounting, positioning or securing of the collar 68. Also, the tapering inward of sidewall section 27 facilitates grasping from the top and rotating the cover assembly 10, as discussed below.

Typically, an internal cross-sectional dimension (perpendicular to axis X) across neck 27n, and seal collar 68, is no more than 85% of a dimension across lower region 27l, that surrounds cartridge 6, typically no more than 75% of this dimension and is typically 35-75%, inclusive, of this dimension.

Referring again to FIG. 12, attention is directed to downwardly depending loops, perimeter loops or hooks 26h on top cover 26. For the example shown there are four such hooks or loops 26h spaced around an outer perimeter 26p of top 26. These hooks or loops 26h are intended to be flexible enough to snap over and engage projections 27p positioned around upper rim 27r of sidewall section 27. Preferably a snap-fit arrangement is used, that is not intended to be separated during a normal lifetime of operation of the assembly 1.

Still referring to FIG. 12, attention is directed to radially outwardly extending protrusions 26t positioned around perimeter 26p of cover 26, with one each oriented between adjacent ones of the loops 26h. The protrusions 26t facilitate grasping of the cover assembly 10, during a rotation and lock, or rotation and unlock, activity described below.

In FIG. 12, at 26a, central aperture is depicted positioned extending through a center portion of cover 26, to provide that the diaphragm 76 is being controlled by biasing spring 77s, against ambient on an opposite side of diaphragm from the spring 77s.

C. Base 9, FIGS. 13-17.

Figure 13:
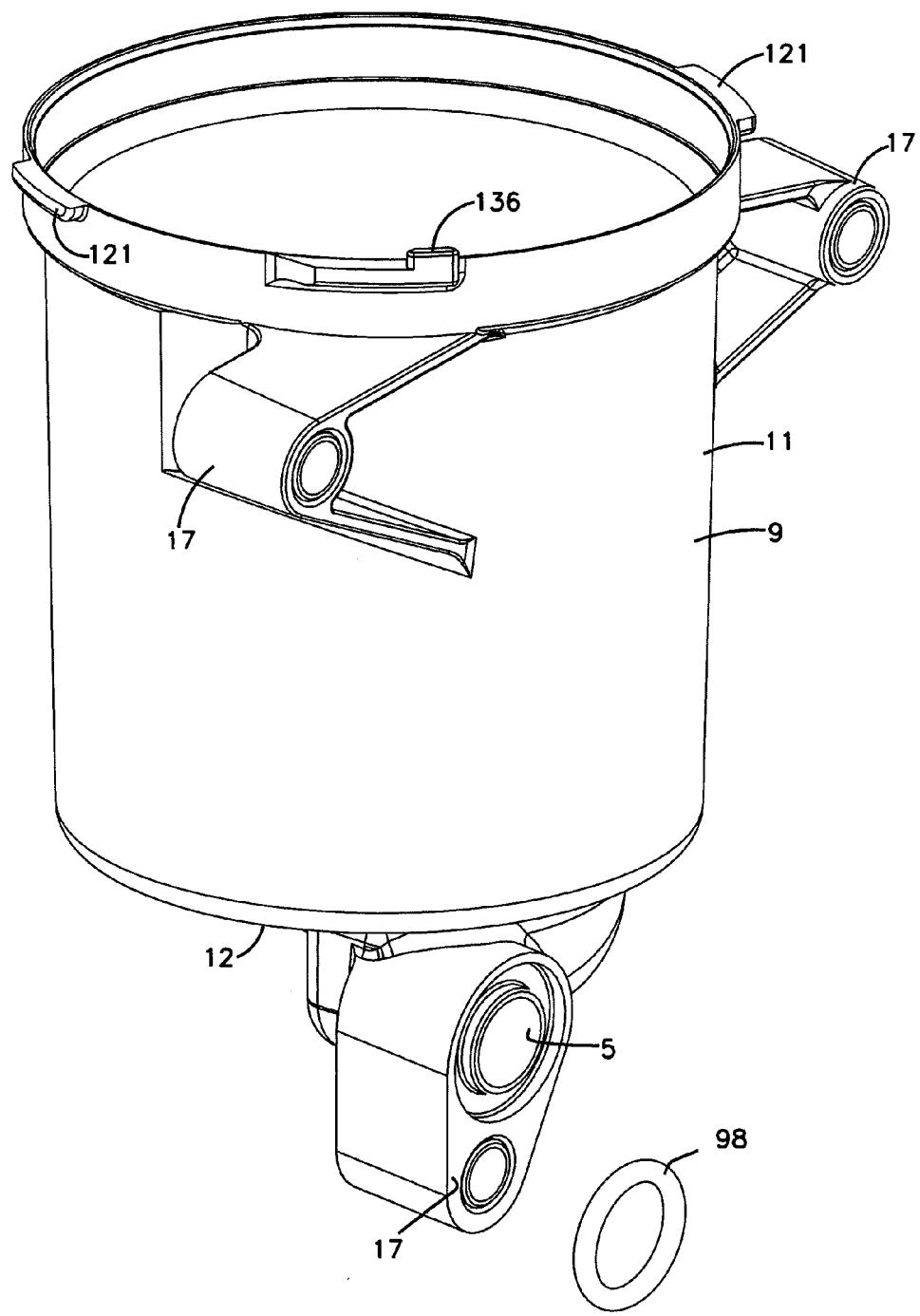
FIG. 13 is a schematic top perspective view of a base component or housing bottom of the crankcase ventilation filter assembly depicted in FIGS. 1 and 2, along with a seal gasket in exploded view.

In FIG. 13, a perspective view of bottom or base portion 9 is depicted. A seal ring 98 is viewable in exploded view, positioned as a gasket to surround an exit from liquid outlet 5.

As indicated above, except for gasket 98, base 9 can be a single integral molded piece. An example of such piece is depicted, and can be better understood from reference to FIGS. 15-17.

Figure 15:
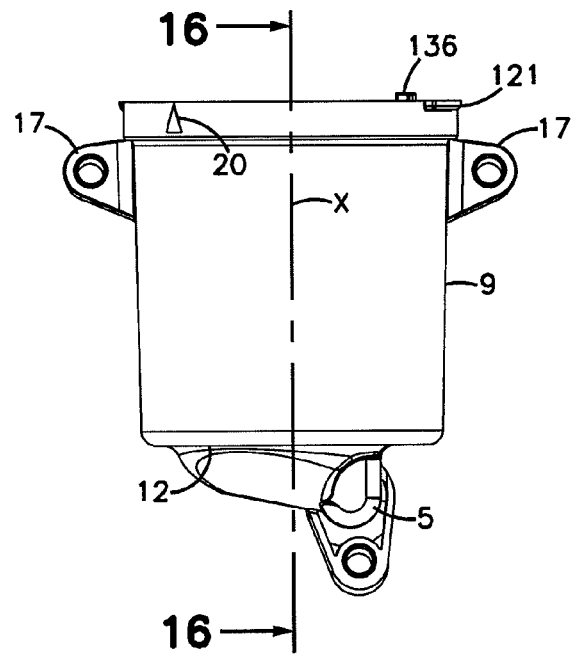
FIG. 15 is a schematic side elevational view of the base component depicted in FIG. 13.
Figure 16:
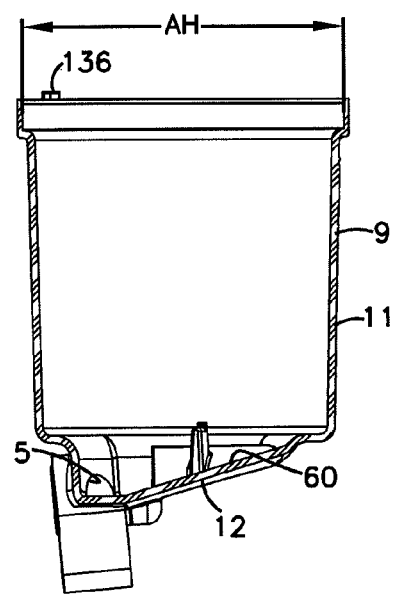
FIG. 16 is a schematic cross-sectional view of the base component depicted in FIG. 15, taken generally along line 16-16 thereof.

In FIG. 15, a side elevational view of base 9 is depicted. FIG. 16 depicts a cross-sectional view taken generally along lines 16-16, FIG. 9. In FIG. 16 an example dimension is indicated at AH is 109.5 millimeter, for the example depicted.

Figure 17:
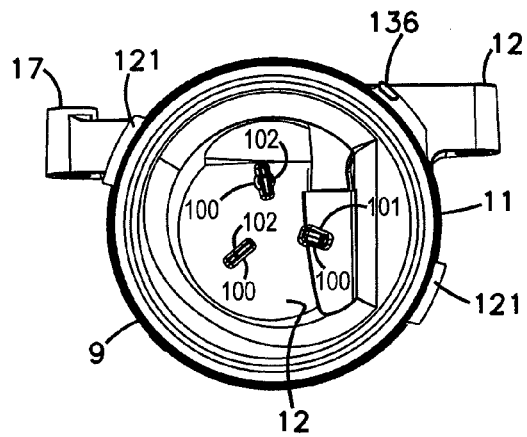
FIG. 17 is schematic top plan view of the base component depicted in FIG. 15.

FIG. 17 depicts a top plan view of the base 9. Attention is directed to interior projections 100 positioned on bottom 12. The projections 100 are positioned for providing centering of projection 65 when cartridge 6 is installed; and, in the example depicted, one of the projections 100, in particular projection 101, is configured to interact with the projection 65 on the cartridge 6, as part of a projection/receiver engagement arrangement to define and maintain a selected rotational orientation of the cartridge 6 relative to base 9 around central axis X. This will be understood in part by reference to FIG. 14.

Referring then to FIG. 14 at 105 a projection/receiver engagement arrangement is depicted which operates in part as a cartridge-to-housing base rotational alignment or orientation arrangement around central axis X to insure that the cartridge 6 is positioned in a selected rotational orientation relative to the bottom or base 9 when it is installed. The particular projection/receiver arrangement 105 depicted is configured so that the cartridge 6 will only be able to fully recess in base 9, during installation, if the cartridge 6 is in a single selected proper rotational alignment. The projection/receiver engagement arrangement engagement 105 depicted comprises projection 101 in the housing bottom 12, projecting upwardly into engagement with another member (recess) 110 on projection 65, corresponding to gap 65g previously discussed. (This engagement is also viewable in cross-section, in FIG. 5).

The other projections 102 viewable in the top plan view of FIG. 17, can be sized and located to partially surround an outer perimeter of projection 65, to act as guides to help center the projection 65 as the cartridge 6 is being installed.

The projection/receiver engagement arrangement 105 described, provides for two preferred effects. A first is that as the cartridge 6 is installed in a housing base 9, cartridge 6 cannot be fully lowered into the housing base 9 unless alignment between a first member (receiver) 110 (gap 65g) and a second member (projection) 101 occurs. This ensures that the cartridge 6 has been rotated around central axis X to a particular preferred, in the example depicted single, orientation before installation is completed. In the event such rotation does not occur, typically interference between the cartridge 6 and the housing top 10 will prevent the housing top from being fully lowered into a position to engage base 9. The proper rotational alignment, ensures that the seal 36 (seal member 36s) is appropriately positioned for engagement with the seal collar 68 to form the intended seal therebetween.

A second desirable effect will be understood from the below description of the engagement between the cover assembly 10 and the housing base 9. In brief, the particular preferred assembly 1 depicted is configured so that, during opening and closing, the cover assembly 10 must rotate through at least a minimal rotation arc around axis X, as it engages or disengages base 9. The projection/receiver engagement arrangement 105 ensures that the cartridge 6 is secured against undesired rotational movement, as this rotation of the cover assembly 10 relative to the base 9 occurs, to advantage.

D. Engagement of Axis Cover Assembly 10 to the Housing Base 9, FIGS. 18-24.

By reference to FIGS. 18-24, a preferred twist-lock or rotational engagement arrangement between the access cover assembly 10 and the base 9 will be understood. Again, as indicated above, a variety of alternate attachments/engagement arrangements between the access cover 10 and the base 9 can be used. However, the particular twist-lock arrangement is convenient, as it does not require attachment of separate engagement members; and/or, a need to provide clearance for a service provider to actually engage joint 15 between the access cover 10 and the base 9.

Figure 18:
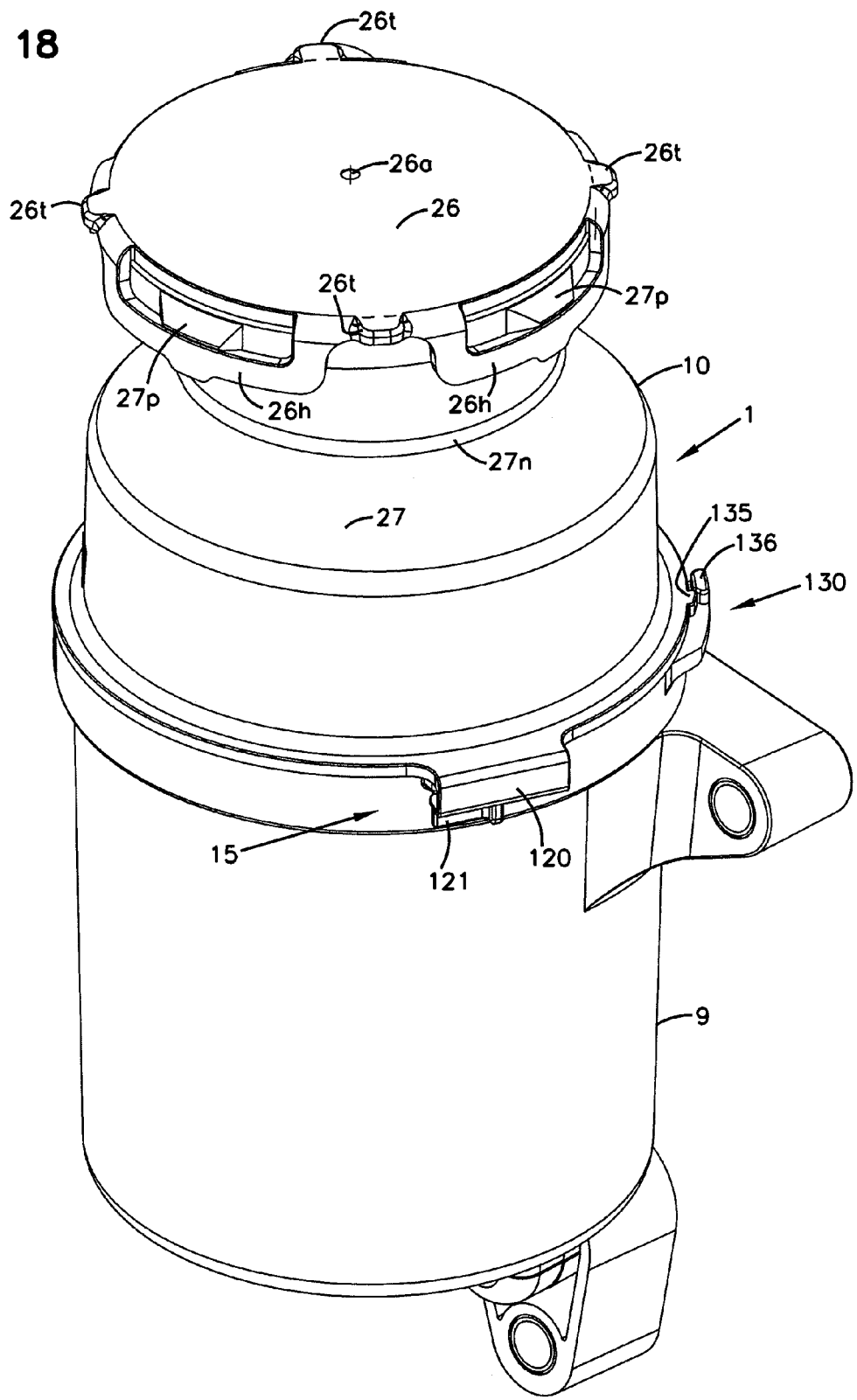
FIG. 18 is a schematic top perspective view of the assembly depicted in FIGS. 1 and 2.
Figure 19:
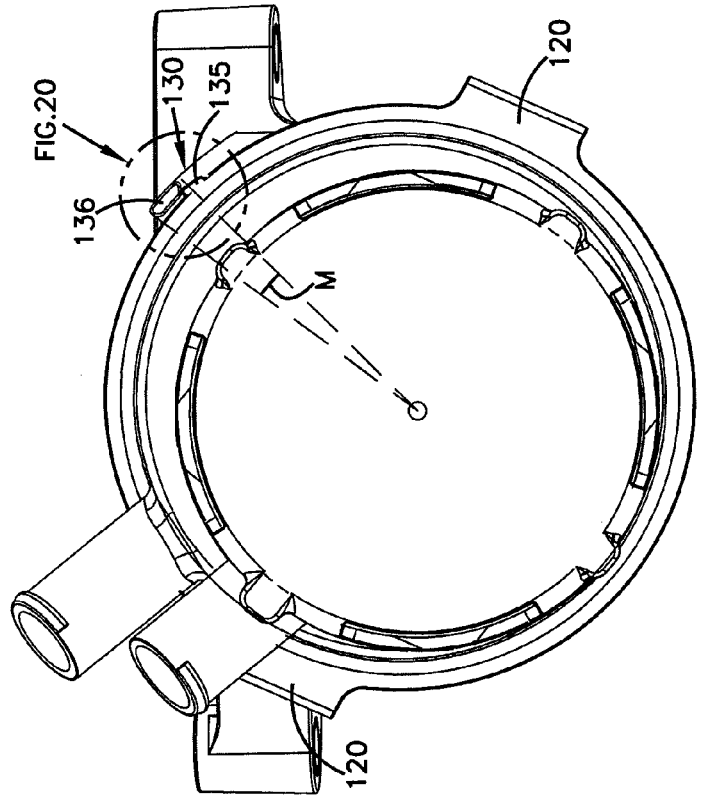
FIG. 19 is a schematic top plan view of the assembly depicted in FIG. 18.

Attention is first directed to FIG. 18. In FIG. 18, a perspective view of the assembly 1 is provided. The perspective view is a top perspective view taken partially downwardly on access cover assembly 10. Portions of joint 15 between the access cover assembly 10 and the base 9 are viewable. Referring to FIG. 18, at 120 an engagement member is depicted on access cover 10, in engagement with a projection 121 on the access cover 9. Typically a "bayonet" type closure system is involved, with the projection 120 formed as a hook or receiver receiving therein (as a result of relative rotation) a portion of projection 121, as the access cover 10 is rotated relative to the base 9. Typically, the closure arrangement will include a second projection 120 positioned 180° opposite projection 120, and a second member 121 positioned 180° opposite projection 121, around central axis X. In FIG. 19, a top plan view, the opposite members 120 can be viewed, each associated with a projection 121 (out of view). Typically, then, if access cover assembly 10 is rotated sufficiently around central axis X, disengagement of members 120 (with respect to members 121) for full release of members 120 with respect to members 121 will be accomplished. Typically the closure arrangement will be configured so that full opening or closing will not occur until rotation over a minimal rotation arc of at least 3'; typically at least 4°, often at least 5° and often chosen to be a minimum amount selected from within the range of 5°-25°, inclusive.

Preferably, the assembly 1 also includes a lock arrangement so that unintended opening of the assembly 1 does not occur. In FIG. 18, the lock arrangement is indicated generally at 130. It comprises a projection 135 projecting radially outwardly from access cover assembly 10 engaged by a flexible cam member 136 on the housing base 9. Thus, for the example assembly 1 depicted, the lock arrangement is cammed lock arrangement, although alternative types of locks and configurations of locks can be used.

In FIG. 18, the cover 10 is shown positioned on base 9 in a fully locked and engaged orientation, as will be typical for normal operation of the assembly 1.

In FIG. 19, a top plan view of the assembly 1 is depicted. Attention is directed to lock arrangement 130. Flexible cam member 136 and projection 135 can be seen as positioned in the locked orientation.

Figure 20:
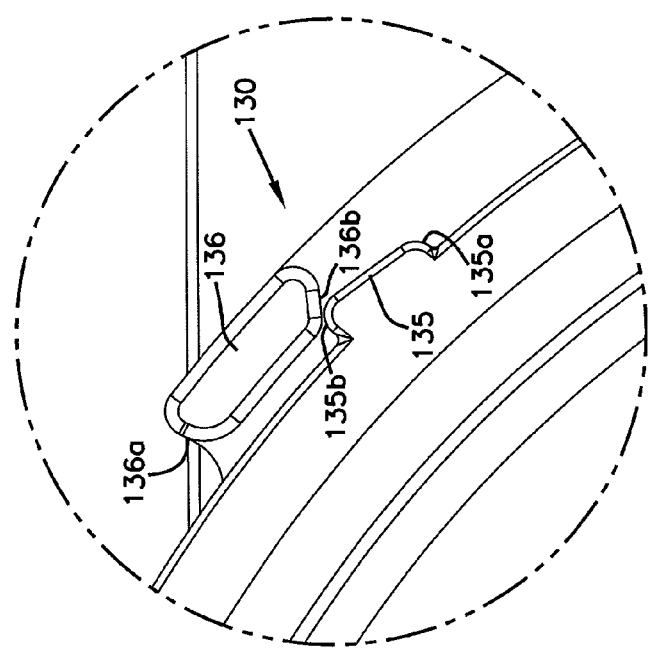
FIG. 20 is a schematic enlarged fragmentary view of an indicated portion of FIG. 19.

In FIG. 20, an enlarged fragmentary view depicting lock arrangement 130 is provided. Projection 135 can be seen as comprising a cam having a shape, slanted radially outwardly between ends 135a, 135b, with the slant generally extending outwardly in a counter clockwise arrangement from the top, around central axis X. It is noted that the cover assembly 10, for the assembly 1 depicted, is configured to rotate clockwise during locking and counterclockwise during unlocking.

Flexible cam 136 is also viewable. It has slanted engagement ends 136a, 136b. When the lock arrangement 130 is fully locked, generally end 135b is engaged with end 136b. As the cover assembly 10 is rotated counterclockwise, FIG. 20, for opening, ends 135b, 136b, will engage, distorting flexible cam 136 radially outwardly, allowing projections 135, 136 to slide past one another. This is depicted, for example, in FIGS. 21 and 22, in which the assembly 1 is depicted with the access cover 10 rotated sufficiently around the central axis X to unlock the engagement between access cover 10 and base 9.

Figure 22:
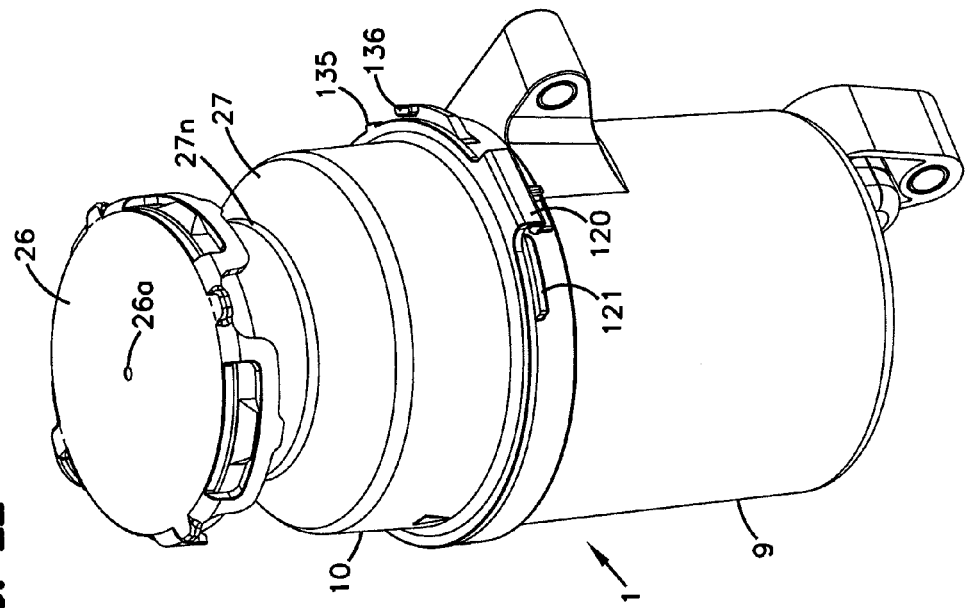
FIG. 22 is a schematic top perspective view of the assembly of FIG. 21, shown in the same step of opening.

Referring to FIG. 22, it can be seen that during this rotation, projections 120 are separated, radially, from projections 121. Thus, access cover assembly 10 can be lifted vertically and be separated from the base 9, for servicing access to cartridge 6.

Figure 23:
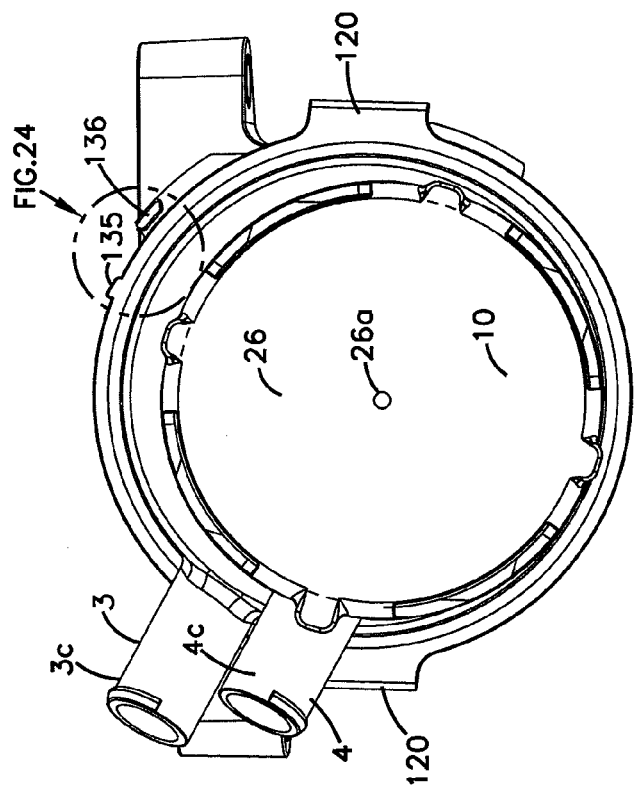
FIG. 23 is a schematic top plan view of the assembly as depicted in FIG. 21.

Attention is directed to FIG. 23, a top plan view of the assembly 1 depicted rotated for opening. It can be seen that member 135 has been rotated past member 136, in a counterclockwise fashion from the viewpoint of FIG. 23.

Figure 24:
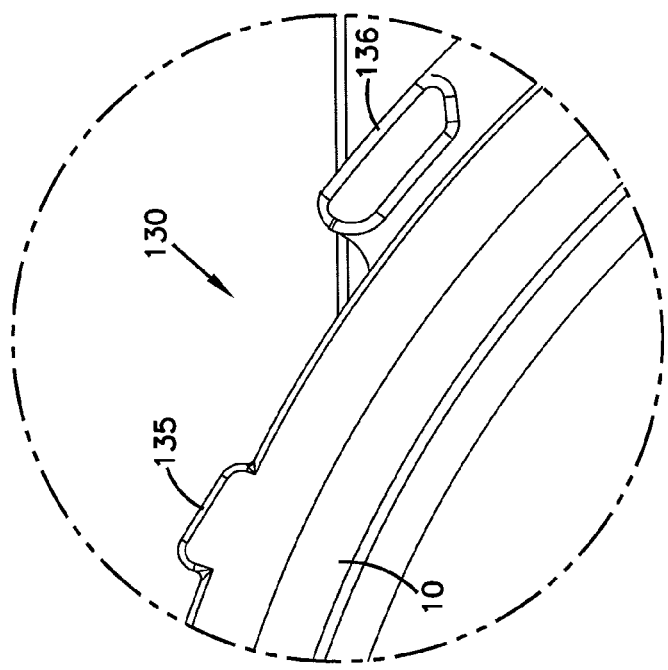
FIG. 24 is an enlarged fragmentary schematic view of an indicated portion of FIG. 23.

FIG. 24 is an enlarged fragmentary view of the lock arrangement 130 shown in an open or unlocked orientation. It can be seen that if cover assembly 10 is rotated in a clockwise manner, projection 135 will be rotated into engagement with member 136, which will flex outwardly until the orientation of the FIG. 20 is reached, at which point projection 136 will bias radially inwardly, providing for the lock or lock orientation.

Of course, the assembly can be configured for an alternate direction of rotation, during unlocking. The counterclockwise rotation for unlocking, for the particular configuration depicted in FIG. 1 will tend move the inlet 3 and outlet 4, FIG. 21, away from structure on which the assembly 1 is mounted, which, for some examples, can be a preferred orientation.

Figure 21:
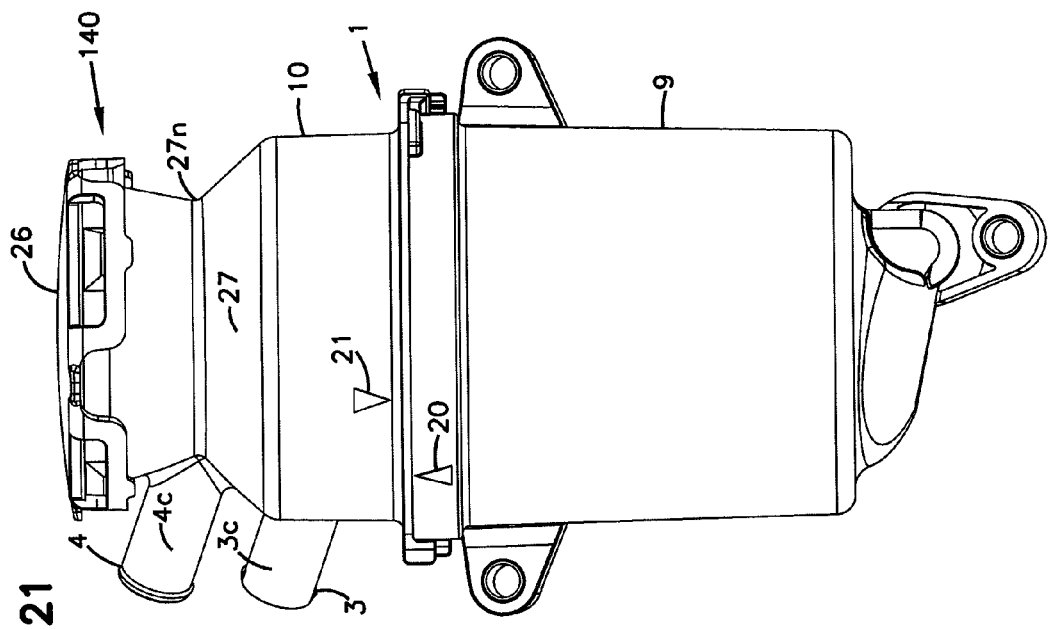
FIG. 21 is a schematic side elevational view of the assembly depicted in FIGS. 1 and 2, shown during a step of opening a housing thereof.

It can also be seen that the service provider need only access the top portion of the cover assembly 10 in the region indicated generally at 140, FIG. 21. The narrowed neck 27n can facilitate opening, by allowing the fingers of a service provider to more easily grasp cover assembly 10, for rotating.

In FIG. 21, attention is directed to indicia 20, 21, shown rotationally separated, indicating an opening orientation. In FIG. 1, the indicia 20, 21 are shown vertically aligned, indicating a rotated closed orientation.

The term "minimal rotation arc" and variants thereof is meant to be an amount of rotation over at least which a rotation of the access cover, relative to the base, must occur for opening. The system can be configured to require more rotation than minimal arc; and, in some instances a service provider can rotate the access cover, relative to the base, more than a minimum necessary during an opening operation. The minimum rotation arc can be seen as defined by the arcuate extension of a member 136, shown in FIG. 19 at angle M.

Herein, a cammed arrangement, which provides for preferred locking of the access cover on the housing base, and against unintended or undesired during normal operation will sometimes be referred to as a cammed lock arrangement or by similar terms.

II. Some Possible Variations

A. The Regulator Valve Assembly

A variety of alternative regulator valve assemblies to valve assembly 50 can be used. An example alternative regulator valve assembly is a two-stage valve assembly as depicted and described in U.S. application 61/270,408, incorporated herein by reference.

B. Relief Valve

The assembly 1 can be implemented with a relief valve. The relief valve would be a pressure relief valve mounted in cooperation with an appropriate portion of interior 2i, to provide immediate relief of internal pressure within assembly 1, should it reach an undesired point. Relief valves have been described as usable in connection with crankcase ventilation filter assemblies before, for example in selected ones of the reference previously incorporated herein by reference.

C. Media Choice

The particular choice of media for media 30m will be a matter of preference for the intended use, and a variety of media can be used. The media can be provided in a layered form, or a non-layered form. It can be provided with a gradient therein, in extension across (or partially across) the media pack. As indicated above, a particularly useful media is the media generally in accord with WO 2006/084282 and/or any of the previously identified publications incorporated herein by reference, which is implemented in a non-pleated, multilayer, coiled configuration.

D. Handle 79

The handle 79, FIG. 7, can be implemented in variety of shapes and sizes and with a variety of features. For example, as indicated above, an aperture arrangement through handle 79, underneath rail 80 can be used to facilitate grasping. Further, rail 80 can be provided with a lateral projection to facilitate grasping. The arcuate extension and particular shape of the handle can be varied. Typically, the handle shape and size will be chosen for convenient fit within the housing 2, during assembly so as not to interfere with components therein.

E. Location of the Inlet 3 and Outlet 4

In the particular assembly 1 depicted, FIG. 5, the inlet 3 is mounted in lower portion 271 of sidewall 26, below narrowed neck 27n; and, the outlet 4 is configured to engage the narrowest portion of narrowed neck 27n. This is also viewable in FIG. 1. This is a particularly convenient arrangement, since it provides for engagement internally at desired locations. However alternatives are possible.

Further, for the particular assembly depicted the inlet 3 and outlet 4 are located, rotationally, around central axis X at radially close or adjacent locations. Alternatives are possible, within the variations possible with principles according to the present disclosure.

F. Alternate Connections

Herein above, a particular rotation or bayonet connection arrangement was described, for securing the access cover to the housing base, with a cammed lock arrangement used to ensure vibration does not cause undesired rotation. Alternate attachment and/or locking arrangements can be used including such arrangements as: over center latches; or, a threaded lock ring. The particular variation depicted, however, is advantageous, because a service provider need only access a very uppermost portion of the assembly 1, to get the access cover 10 to move or detach.

G. Alternate Bottom Load Features

The assembly 1 depicted is configured for top loading. Features as described in WO 2008/157251 can be implemented, to allow for additional or alternative bottom loading of the cartridge.

H. Alternative In-to-Out Flow Patterns

Many of features characterized herein can be alternatively implemented in an arrangement configured for in-to-out flow during filtering. General feature variations to allow for this relate to: location and number of housing seals on the cartridge; and, location and configuration of bottom drain features. In-to-out flow arrangements are described for example in WO 2008/115985 and some of the analogous features thereof could be implemented with the principles herein, to accomplish such an effect. It is noted that with such arrangements, the cartridge is typically provided with no central aperture through the lower end piece, as liquid draining is not intended to occur until gases have passed at least partly through the media pack. Further, typically, a seal is positioned radially inwardly from the outer perimeter of the lower end piece, where a liquid drain occurs on a downstream side of the seal or at the outer perimeter of the media pack.

III. General Characterization of Features; Components; Assemblies; and Operation According to the present disclosure, various features, components, methods and techniques are described, usable in connection with crankcase ventilation filter assemblies and components thereof. In general terms, such assemblies include a housing and an internally received, removable and replaceable, i.e. serviceable, filter cartridge. The housing typically includes: a gas flow inlet arrangement or inlet; a gas flow outlet arrangement or outlet; and, a lower drain outlet arrangement or outlet. The gas flow inlet and outlet and the liquid flow outlet can each be a single aperture or more than one aperture in the housing, and no specific number is meant to be referenced by the terms used, unless specified.

The housing generally surrounds, and defines, a housing central axis.

The filter cartridge generally comprises a media pack including media configured to surround an open filter interior and defines a cartridge central axis. The housing central axis and cartridge central axis are typically the same, although alternates are possible.

The assembly, as discussed above, can be configured for "out-to-in" flow, in which gases to be filtered are directed through the media from an exterior to an interior during filtering and coalescing; or, the assembly can be configured for "in-to-out flow", in which the gases flow from the open filter interior outwardly through the media pack to an exterior, during filtering an coalescing. An example configured for out-to-in flow during normal operation is depicted and described in detail.

A variety of features and aspects are described. There is no specific requirement that all of the features and aspects characterized be incorporated in an assembly, for the assembly to include improvements in accord with the present disclosure. However the example assembly depicted and described is improved and advantageous as a result of including the many various features shown and described.

In general, the housing comprises a housing base and an access cover. In a first, optional, aspect, the access cover is removeably secured to the housing base with a rotational engagement arrangement. The rotational engagement arrangement is configured so that during engagement of the housing access cover to the housing base, and during separation of the housing access cover from the housing base, the access cover is rotated, relative to the base, over a minimal radial arc (sometimes referenced as the minimal engagement arc, minimal rotation arc, or minimal separation arc or by variations thereof). By the term "minimal" in this context, it is meant that for the housing access cover to be fully engaged on (or separated from) the housing base, a relative rotation between the two of at least the minimal arc is required.

In an assembly depicted, the access cover includes an interior seal collar defining a radially inwardly directed cartridge seal surface. The interior seal collar, with the inwardly directed cartridge seal surface, is secured within the access cover in a manner such that the seal collar and cartridge seal surface rotate, relative to the housing base, over at least the minimal radial arc when the access cover is rotated, relative to the housing base, during engagement and/or separation between the access cover and the housing base.

As indicated, crankcase ventilation filter cartridge is removeably positioned within the housing interior. A crankcase ventilation filter cartridge generally comprises a media pack including media surrounding and defining an open filter interior. A first seal member is positioned on the filter cartridge in releasable sealing engagement with the radially inwardly directed cartridge seal surface of the interior seal collar on the access cover. By "releasable sealing engagement" it is meant that the first seal member and the seal surface are engaged a sealing manner, but they are separable during servicing.

In an example assembly described, the filter cartridge is non-rotatably secured within the housing base. Thus, when the access cover is rotated through at least the minimal radial arc (engagement arc or separation arc) the radially inwardly directed cartridge seal surface is rotated around a portion of the cartridge. In an example arrangement, the radially inwardly directed cartridge seal surface, during such a rotation, can move radially relative to the cartridge even when in engagement with the first seal member.

Herein, the example first seal member depicted will sometimes be characterized as a "radial seal member" since the sealing forces between the seal member and the cartridge sealing surface are generally directed radially relative to a cartridge central axis (X) defined by the media. The depicted example seal arrangement will sometimes be characterized as an "outwardly directed radial seal" or by variants thereof, to indicate that the engagement is with the seal surface on the access cover surrounding the seal member.

In an example assembly depicted, the access cover is configured to be rotated, relative to the housing base, over a minimal radial arc of at least 3°, typically at least 5°, and usually an amount selected from within the range of 5°-25°, inclusive, during each of engagement and separation between the access cover and the housing base. The term "minimal arc" in this context is meant to reference movement from, or between, a fully engaged orientation and a fully disengaged orientation with rotation of at least the minimal radial arc around the central axis (X) being needed. By this, it is not meant that the access cover cannot (or should not) be rotated further, merely that full separation between the access cover and housing base would typically not be possible until at least a rotation through the minimal arc defined.

In an example assembly depicted, the first seal member defines a first seal (perimeter) plane and the media surrounds defines a cartridge central axis (X). In an example depicted, the first seal plane is non-orthogonal to the cartridge central axis. By "non-orthogonal" and variants thereof, in this context, it is meant that the first seal plane (perimeter) intersects the cartridge central axis at a smallest acute angle of intersection other than 90°. Typically a smallest acute angle of intersection between the first seal (perimeter) plane and the central cartridge axis, which is the smallest angle of intersection, is within the range of 80°-89°, inclusive, typically within the range of 83°-87°, inclusive. The term "a smallest acute angle of intersection" and variants thereof, in this context, then is meant to refer to the smallest intersection angle between the referenced axis and referenced seal (perimeter) plane.

In accord with an aspect of the present disclosure, a crankcase ventilation filter assembly is described which includes a projection/receiver engagement arrangement comprising at least: a first engagement member on the filter cartridge; and, a second engagement member on the housing base. The projection/receiver engagement arrangement is configured for the first and second engagement members to engage, when the cartridge is fully installed in the housing base, in a manner such that the cartridge cannot rotate, relative to the housing base. Thus, the projection/receiver engagement arrangement is, typically, an "anti-rotation" engagement arrangement.

Typically, the projection/receiver arrangement is configured so that the cartridge can only be fully installed in the housing base in a single rotational orientation around a cartridge central axis. Thus, typically the projection/receiver arrangement comprises an anti-rotation arrangement, and, a cartridge-to-housing base rotation alignment arrangement that only allows for full cartridge installation at a single rotational alignment between the filter cartridge and housing base.

In an example described, a receiver member of the projection/receiver arrangement is positioned on the cartridge, which, in a specific example, comprises a receiver gap or receiver in a tip of a projection on the cartridge; and, the projection member comprises a projection in a bottom of the base that projects into the receiver gap during cartridge installation.

As indicated above, there is no specific requirement that all of the features characterized be incorporated in an assembly, for some advantage to be reached. Thus, there are multiple aspects of the present disclosure, which involve selected ones but not all of the characterized features above.

An example of such an aspect of the present disclosure, is a provision of a crankcase ventilation filter assembly comprising a housing including a housing interior and again having: a gas flow inlet or inlet arrangement; a gas flow outlet or outlet arrangement; and, a bottom liquid drain outlet or outlet arrangement. In general, the housing comprises an access cover assembly having: a seal collar defining a radially inwardly directed cartridge seal surface; and, a base comprising: a sidewall; and, a bottom.

The crankcase ventilation filter assembly, according to this aspect of the present disclosure, again includes an internally received, removable, crankcase ventilation filter cartridge. The cartridge preferably comprises: first and second, opposite, end pieces; and, a media pack including media positioned between the first and second, opposite, end pieces; the media surrounding and defining an open interior and the media defining an inner media perimeter and an outer media perimeter. Typically, the inner media perimeter and outer media perimeter will be generally circular in cross-section (i.e. the media is generally cylindrical in outer shape) but this is not required in all aspects of the present disclosure. Typically, the media will be unpleated and configured as a multi-layered coil of unpleated media, but, again, this is an optional and variations are possible.

In a typical assembly, according to this aspect of the present disclosure, the first end piece of the cartridge comprises an upper end piece (in use) having a first seal support projection thereon projecting away from the media and to supporting an outwardly directed first seal member at a location in projection overlap with the media pack, typically at a location spaced radially outwardly from the media inner perimeter and radially inwardly from the media outer perimeter. The first seal member is releasably sealed to the seal collar in the access cover. By the term "in projection overlap" in this context, reference is meant to a location across the media, from the inner media perimeter to the outer media perimeter, which would be overlapped by a projection on the first seal member into a plane orthogonal with the cartridge central axis (simple overlap if the seal member is in a seal plane orthogonal to the cartridge central axis). By the term "releasably sealed" and variants thereof, in this context, reference is meant to a seal that is engaged in the assembly as fully assembled for operation; and, which is released or separated, i.e. open, when the cartridge is separated from housing componentry. By the term "in use" in this context, reference is meant to a typical orientation of the feature when the assembly is fully assembled and installed for operation to filter crankcase ventilation filter gases in vehicle or other equipment.

Typically, the seal is positioned so that no portion of the seal surrounds the media. Alternately stated, the seal is oriented above the media in use, with no portion of a plane defined by the seal, being an intersection with the media.

Typically, the first seal member defines a circular perimeter in projection overlap with media.

In a typical embodiment, the second end piece has an outer perimeter and a second seal member is positioned outer cartridge, typically on the second end piece and typically around the outer perimeter of the second end piece. This seal member is typically positioned to form an outwardly directed (radial) seal with a housing base, for example at a location surrounding the second end piece. Thus, a perimeter of the second seal member is often larger than a perimeter of the second end piece. The second end piece typically further includes a central projection thereon extending downwardly (in use) from the second end piece in a direction away from the media.

In an example described, the central projection defines an internal liquid flow passageway in flow communication with the open filter interior; the internal liquid passageway defining an internal conduit of a selected cross-sectional size. Typically, this cross-sectional size is such that internal conduit does not extend into overlap with the media at a perimeter location greater than half-way across the media from the inner perimeter to the outer perimeter (sometimes referenced as a 50% media thickness perimeter). Preferably, the internal conduit has a cross-sectional size such that it does not extend into overlap with the media at a location greater than a perimeter size that is 20% across the thickness of the media pack from the inner perimeter (of the same size) to the outer perimeter. Further, preferably the internal conduit is of a cross-sectional size such that it does not extend into overlap with the media at all, but rather remains in perimeter overlap with an open filter interior defined by the media.

Herein, when it is said that the first seal support projection projects away from the media pack, no specific reference to an angle of projection away from the media is meant, only that the extension is away from the media as opposed to toward the media. Typically, the projection will be generally parallel to the cartridge central axis (X), but this is not required.

Similarly, when it said that the "central projection" on the second end piece extends away from the media, no reference is meant to a specific angle of extension, only that the projection is away from the media. Again, a direction of projection generally parallel to the cartridge central axis (X) will be typical.

In a typical assembly, the gas flow inlet and gas flow outlet are each positioned on the access cover. Typically, each comprises a single aperture through the access cover, surrounded by a tubular conduit, although alternatives are possible.

As described with respect the aspect of the invention discussed previously, the first seal member, on the first seal support projection, can be configured to define a perimeter seal plane; and, the perimeter seal plane can be non-orthogonal to a central axis of the filter cartridge. Typically, when this is the case, the smallest acute angle of intersection between the seal plane and the central axis will be within the range of 80°-89°, typically within the range of 83°-87°, although alternatives are possible.

In a typical, preferred, assembly, the first seal member comprises a seal member having a generally rectangular cross-section, recessed in a seal receiver groove surrounding the first seal support projection. The first seal member typically has a free lip, i.e. a portion not recessed within the sealing groove that: extends outwardly at least 1 mm, typically 1-5 mm inclusive; has a thickness within the range of 1-3 mm, typically 1-2 mm inclusive; and, typically, has an amount of free extension outwardly that is greater than its thickness (when not installed). Herein, when characterizations are made of the various seals, and their shape definition etc., reference is meant to an undistorted configuration when the cartridge is not installed.

Typically, again, a first seal member defines a circular perimeter in projection into a plane orthogonal to the central axis of the cartridge, when not installed.

Typically, the access cover is rotatable relative to the base, over at least a minimal rotational (radial) arc or rotation angle during opening and closing of the housing, while the first seal member is surrounded by the seal cartridge. Typically, this minimal (radial) rotation arc or angle is defined to be a minimal radial arc of at least 3°, typically at least 5°, and often within the range of 5°-25°, during engagement and separation between the access cover and the housing base.

In a typically assembly, the second end piece of the cartridge is configured to engage the base with an anti-rotation engagement arrangement to prevent the filter cartridge from rotating when the access cover is rotated to open and/or close the housing. The anti-rotation engagement arrangement typically comprises a projection/receiver engagement arrangement including a first engagement member on the central projection and a second member in the bottom of the base. As previously characterized, the first engagement member of the projection/receiver arrangement may comprise a receiver gap in a tip of the central projection and the second member of the projection/receiver arrangement comprises a projection in the bottom of the housing base that is received within the receiver gap in the central projection.

In an example assembly depicted, the housing base includes a lower, radially inwardly projecting, inner perimeter shoulder and the filter cartridge includes a lower seal flange in abutment with the perimeter shoulder. This lower seal flange, for example, can be a flange that extends downwardly from a perimeter of the second end piece and also radially outwardly from the cartridge central axis.

The cartridge includes a handle projection extending in a direction away from the first seal member in the media pack. While this direction of extension may be generally parallel to the central axis, it is not required to extend parallel to the central axis. Typically, the handle projection is arcuate, and has an arcuate upper rail that extends over a radial arc, relative to a cartridge central axis, within the range of 5°-80°, inclusive, typically within the range of 10°-45° inclusive. The handle projection can optionally include an aperture arrangement therethrough positioned beneath the upper radial. The handle can include a lateral rib, for example on the outside or convex side, to facilitate handling.

In general, the filter cartridge includes a central porous core around which the media is positioned. Typically, the first end piece, the second end piece and central porous core comprises a single, integrally, molded, piece.

In an example assembly depicted, the bottom liquid drain, in the housing is offset from overlap with a central axis of the housing and filter cartridge. Indeed in a depicted embodiment the bottom liquid drain is not intersected by the central axis of the filter cartridge. Also, typically, the bottom of the housing includes a lower funnel surface definition that funnels liquid to the bottom liquid drain. When the liquid drain is offset, the lower funnel surface is a lower, eccentric, funnel surface; i.e. a funnel surface that funnels liquid toward a side of the housing base or bottom.

Typically, the assembly includes at least two, radially spaced, upwardly projecting centering projections on the housing base. These at least two projections are typically oriented to surround a portion of the center projection and to help center the filter cartridge relative to the housing base, during installation.

In an example assembly depicted, the access cover optionally includes a top end, bottom end, and a narrowed perimeter neck. The narrowed perimeter neck is positioned at a location between the top end and the bottom end. The narrowed perimeter neck is typically at a portion of the access cover positioned above the media pack of the filter cartridge, when installed. In an example depicted, the gas flow inlet is positioned in gas flow communication within an interior of the access cover at a location below a narrowest portion of the narrowed perimeter neck; and, the gas flow outlet is positioned in gas flow communication with the interior of the access cover at a location that intersects a narrowest portion of the narrowed perimeter neck.

In an assembly depicted, the seal collar is optionally positioned to extend downwardly from the narrowed perimeter neck. This is an advantageous location, for example for assembly of a sidewall of the access cover as single a molded piece.

A typical assembly configured as described above, will include a gas flow regulator assembly positioned in the access cover at a location regulating gas flow between the filter cartridge and the gas flow outlet. The gas flow regulator assembly may include, for example, a receiver having an upper tip which is open, and a regulator valve member, for example a flexible diaphragm valve, positioned above the tip, with regulator control provided by a biasing member, such a biasing spring, in engagement with the diaphragm.

A variety of media materials can be used. Typically, the media comprises a multi-layer coil of unpleated media.

In an example described, the filter cartridge includes a bottom liquid drain arrangement draining liquid directly downwardly from a lower end of the media at a location underneath, and in overlap with, the media. The bottom liquid drain arrangement can, for example, comprise a plurality of apertures spaced from one another, and positioned around the cartridge central projection in the second end piece.

In a depicted example assembly, the cover is optionally secured to the base with a rotatable bayonet engagement arrangement. The housing preferably includes a cammed rotation lock engagement arrangement that inhibits vibration of equipment on which the assembly is used, from causing the cover to rotate relative to the base until intended, i.e., that prevents unintended rotation of the access cover relative to the housing base.

According to the present disclosure, components for use in a crankcase ventilation filter assembly are described. An example component characterized is a crankcase ventilation filter cartridge configured for removable installation in a housing of a crankcase ventilation filter assembly. The filter cartridge preferably comprises: first and second, opposite, end pieces; and, a media pack comprising media positioned between the first and second end pieces; the media surrounding and defining an open filter interior and cartridge central axis. The media generally defines an media inner perimeter and an media outer perimeter.

A first seal support projection is positioned on the first end piece located on an opposite side of the first end piece from the media pack. The first seal member is positioned on, and around, the first seal support projection; the first seal member optionally defining a circular perimeter, in projection into a plane orthogonal to the cartridge central axis. The first seal member preferably defines a seal plane non-orthogonal to the cartridge central axis, however. The first seal member defines a seal perimeter (typically circular in projection into a plane orthogonal to the central axis) sized in projection: smaller than the media outer perimeter; and, larger than the media inner perimeter.

In a typical example, the first seal member defines a seal plane extending at a smallest acute angle of intersection with the cartridge central axis within the range 80°-89°, typically 83°-87°, relative to the cartridge central axis.

A second seal member is positioned on, or around, an outer perimeter of the second end piece. The second seal perimeter is configured to seal against an outer surrounding sidewall of the filter housing, in a releasable manner, when the cartridge is installed for use.

The cartridge typically includes a first member of anti-rotation, projection/receiver, engagement arrangement positioned on the second end cap at a location to engage a portion of the filter housing, in use, to prevent relative rotation between the filter cartridge and the engaged portion of the filter housing. Typically, the first member of anti-rotation, projection/receiver, engagement arrangement comprises a projection on the cartridge which includes a receiver gap therein, at a lower end of the cartridge, i.e. end of the cartridge, opposite where the first seal member is located.

In an example disclosed, the first seal member is recessed in a receiver groove and typically defines a free lip: of outward extension of at least 1 mm, typically 1-5 mm, inclusive, in extension; with a thickness within the range of 1-3 mm, inclusive, typically 1-2 mm inclusive, although alternatives are possible. The first seal member typically has rectangular cross-section. Reference to "free lip" is meant to refer to a portion of the seal member that projects out of a receiver groove in the projection on which the first seal member is positioned. The reference to outward extension is meant to refer to a dimension in extension away from the projection and out of the groove or receiver. Typically, the extent of free extension or outward extension is greater than the thickness of the seal member in the free lip.

Typically, the first seal member defines a perimeter size, in projection into a plane orthogonal to the cartridge central axis, that is spaced radially inwardly from overlap with a media outer perimeter, a distance corresponding to at least 10%, usually at least 20% and typically at least 30% of a distance from the media outer perimeter to the media inner perimeter; and, which is spaced radially outwardly from overlap with a media inner perimeter a distance that is at least 10%, usually at least 20% and typically at least 30%, of a distance from the media inner perimeter to a media outer perimeter.

In a typical cartridge, configured for out-to-in flow in use, a central projection is provided on the second end piece that surrounds and defines a liquid flow conduit and projects in a direction away from the media. The central projection defines a lower tip with the receiver gap therein, in an example described.

Typically, the central projection defines a liquid flow conduit having a cross-sectional size no greater than a size corresponding to a definition of media which would have an outer perimeter at a location 50% between the thickness of the media from the inner media perimeter to the outer perimeter, typically of a size no more than 20% of a distance from the media inner perimeter to the media outer perimeter.

Preferably, the liquid flow conduit defined by the central projection has a cross-sectional size that is smaller than the inner media perimeter and is located such that it is not in overlap with the media. There is preferably no housing seal positioned on the central projection, when the cartridge is configured for out-to-in flow during use.

Typically, a central aperture is provided in each of the first end piece and the second end piece, when the cartridge is configured for "out-to-in flow" during use. Also, typically the second end piece includes a bottom drain arrangement comprising at least one drain aperture: spaced from the central aperture; and, positioned in the overlap with the media at a location between the media inner perimeter and the media outer perimeter. The bottom drain arrangement may comprise a plurality of spaced apertures position spaced from, and around, the central aperture in the second end piece.

Typically, the cartridge is such that a second seal member, positioned on the second end piece, includes a lower skirt lip directed both downwardly from the media and second end piece, and radially outwardly from the cartridge central axis. Also, typically the second seal member includes at least two radially outwardly directed, spaced, radial seal lips.

Again, the media can comprise a multi-layered coil of unpleated media, as will be typical, although alternatives are possible. Typically, again, the filter cartridge includes a central porous core around which the media is positioned; and, the first end piece, second end piece, and porous core comprise a single integrally molded piece, although alternatives are possible.

In general terms, an aspect of the present disclosure comprises providing a ventilation filter assembly that is as characterized, including a filter cartridge as characterized operably positioned therein.

Again, there is no requirement that a crankcase ventilation filter ventilation filter assembly, or component thereof, include all of the features characterized herein, in order to obtain some advantage according to the present disclosure.

Also according to the present disclosure, methods of assembly and use are described. These can generally be characterized as involving generation of, and/or operation of, various-ones of the features described.

What is claimed:

1. A crankcase ventilation filter assembly comprising:
   (a) a housing defining a housing interior and a housing central axis, and having: a gas flow inlet; a gas flow outlet; and, a liquid drain outlet;
      (i) the housing comprising a housing base and an access cover; the access cover being removeably secured to the housing base with a rotational engagement arrangement in which, during engagement and separation, the access cover is rotated, relative to the base, over at least a minimal radial arc around the housing central axis; the housing being completely separable from the access cover upon a total rotation within the range of 5°-25°, inclusive; and,
      (ii) the access cover including an interior seal collar defining a radially inwardly directed cartridge seal surface; the interior seal collar and radially inwardly directed cartridge seal surface being secured within the access cover in a manner such that the seal collar and cartridge seal surface rotate, relative to the housing base, over at least the minimal radial arc around a housing central axis when the access cover is rotated, relative to the housing base, during engagement and separation between the access cover and housing base; and,
   (b) a crankcase ventilation filter cartridge removeably positioned within the housing interior; the crankcase ventilation filter cartridge comprising:
      (i) first and second, opposite, end pieces;
      (ii) a media pack comprising media positioned between the first and second end pieces; the media surrounding and defining an open filter interior and a cartridge central axis;
         (A) the media defining an media inner perimeter and a media outer perimeter;
      (iii) a first seal support projection positioned on the first end piece and located on an opposite side of the first end piece from the media pack;
      (iv) a first seal member positioned on, and around, the first seal support projection;
         (A) the first seal member defining a circular perimeter, in projection into a plane orthogonal to the cartridge central axis;
         (B) the first seal member defining a seal plane non-orthogonal to the cartridge central axis; and,
         (C) the first seal member defining a seal perimeter having a size, in projection into a plane orthogonal to the cartridge central axis, that is smaller than the media outer perimeter;
      (v) a first member of an anti-rotation projection/receiver arrangement engaging a portion of a filter housing and preventing relative rotation between the filter cartridge and the engaged portion of the filter housing.

2. A crankcase ventilation filter assembly according to claim 1 wherein:
   (a) the projection/receiver engagement arrangement includes a cartridge-to-housing base rotational alignment arrangement which provides that the cartridge can only be fully installed in the housing base in a single rotational orientation around the cartridge central axis.

3. A crankcase ventilation filter assembly comprising:
   (a) a housing defining a housing: interior and having: a gas flow inlet; a gas flow outlet; and, a bottom liquid drain outlet; the housing comprising:
      (i) an access cover assembly having: a seal collar defining a radially inwardly directed cartridge seal surface; and,
      (ii) a base comprising a sidewall; and, a bottom; and,
   (b) an internally received, removable, crankcase ventilation filter cartridge comprising:
      (i) first and second, opposite, end pieces;
      (ii) a media pack including media positioned between the first and second end pieces; the media surrounding and defining an open filter interior and a cartridge central axis; and, the media defining an inner media perimeter and an outer media perimeter;
      (iii) the first end piece comprising, in use, an upper end piece having a first seal support projection thereon: projecting away from the media pack and located on an opposite side of the first end piece from the media pack; and, supporting an outwardly directed first seal member at a location in projection overlap with the media pack at a location spaced radially outwardly from the media inner perimeter and spaced radially inwardly from the media outer perimeter;
      (iv) the first seal member on the first seal support projection releasably sealed to the seal collar in the access cover; and,
      (v) the first seal member defining a circular perimeter, in projection into a plane orthogonal to the cartridge central axis;
      (vi) the first seal member defining a seal plane non-orthogonal to the cartridge central axis; and,
      (vii) the first seal member defining a seal perimeter having a size, in projection into a plane orthogonal to the cartridge central axis, that is smaller than the media outer perimeter;
      (vii) the second end piece having an outer perimeter;
         (A) the second end piece including a central projection thereon extending downwardly, in use, from the second end piece in a direction away from the media; the central projection defining an internal liquid flow passageway in flow communication with the open filter interior; the internal liquid passageway defining an internal conduit of cross-sectional size that does not extend into overlap to the media at a conduit perimeter location greater than halfway across the media from the inner media perimeter to the outer media perimeter; and,
   (c) a first member of an anti-rotation projection/receiver arrangement engaging a portion of the filter housing preventing relative rotation between the filter cartridge and the engaged portion of the filter housing.

4. A crankcase ventilation filter assembly according to claim 3 including:
   (a) a second seal member oriented on an outer perimeter of the second end piece to from an outwardly directed seal with the housing at a location surrounding the second end piece.

5. A crankcase ventilation filter assembly according to claim 3 wherein:
   (a) the internal liquid passageway of the central projection on the second end piece has a conduit cross-sectional size that does not extend into overlap with the media at a location greater than 20% of a distance across the media from the inner media perimeter to the outer media perimeter.

6. A crankcase ventilation filter assembly according to claim 3 wherein:
(a) the internal liquid passageway of the central projection on the second end piece has a conduit cross-sectional perimeter size no greater than an inner perimeter cross-sectional size of the media and which does not extend into overlap with the media.

7. A crankcase ventilation filter assembly according to claim 3 wherein:
(a) the gas flow inlet and gas flow outlet are positioned on the access cover.

8. A crankcase ventilation filter assembly according to claim 3 wherein:
(a) the first seal member comprises a flat ring seal member partially recessed in a seal receiver groove surrounding the first seal support projection.

9. A crankcase ventilation filter assembly according to claim 3 wherein:
(a) the first seal member has a rectangular cross-section and defines a free lip of: at least to 1 mm in outward extension; and, a thickness within the range of 1-2 mm, inclusive.

10. A crankcase ventilation filter assembly according to claim 3 wherein:
(a) the media surrounds and defines a cartridge central axis;
(b) the bottom liquid drain is offset from overlap with the cartridge central axis; and,
(c) the bottom of the housing base includes a lower, eccentric, funnel surface to funnel liquid to the bottom liquid drain, in use.

11. A crankcase ventilation filter assembly according to claim 3 including:
(a) at least two, radially spaced, upwardly projecting centering projections in the housing base oriented: surrounding a portion of the center projection on the cartridge; and, helping center the filter cartridge relative to the housing base, during cartridge insertion.

12. A crankcase ventilation filter assembly according to claim 3 wherein:
(a) the access cover includes: a top end; a bottom end; and, a narrowed perimeter neck positioned between the top end and the bottom end;
(i) the narrowed perimeter neck being positioned, in use, above the media pack of the filter cartridge.

13. A crankcase ventilation filter assembly according to claim 12 wherein:
(a) the gas flow inlet is positioned in gas flow communication with an interior of the access cover at a location below a narrowest portion of the narrow perimeter neck; and,
(b) the gas flow outlet is positioned in gas flow communication with an interior of the access cover at a location in overlap with a narrowed portion of the narrowed perimeter neck.

14. A crankcase ventilation filter assembly according to claim 12 wherein:
(a) the seal collar is positioned, in use, to extend downwardly from the narrowed perimeter neck.

15. A crankcase ventilation filter cartridge configured for removable installation in a housing of a crankcase ventilation filter assembly; the filter cartridge comprising:
(a) first and second, opposite, end pieces;
(b) a media pack comprising media positioned between the first and second end pieces; the media surrounding and defining an open filter interior and a cartridge central axis;
(i) the media defining an media inner perimeter and a media outer perimeter;
(c) a first seal support projection positioned on the first end piece and located on an opposite side of the first end piece from the media pack;
(d) a first seal member positioned on, and around, the first seal support projection;
(i) the first seal member defining a circular perimeter, in projection into a plane orthogonal to the cartridge central axis;
(ii) the first seal member defining a seal plane non-orthogonal to the cartridge central axis; and,
(iii) the first seal member defining a seal perimeter having a size, in projection into a plane orthogonal to the cartridge central axis, that is smaller than the media outer perimeter;
(e) a first member of an anti-rotation projection/receiver arrangement positioned to engage a portion of a filter housing, in use, to prevent relative rotation between the filter cartridge and the engaged portion of the filter housing;
(i) the first member of an anti-rotation arrangement being positioned on the second end cap and comprising a central projection defining an internal liquid flow on the second end cap at a location projecting away from the first end cap; the central projection having a receiver gap therein.

16. A crankcase ventilation filter cartridge according to claim 15 wherein:
(a) the first seal member defines a seal perimeter having a size, in projection into a place orthogonal to the cartridge central axis, that is larger than the media inner perimeter.

17. A crankcase ventilation filter cartridge according to claim 15 wherein:
(a) the first member of an anti-rotation projection/receiver arrangement is positioned on the second end cap.

18. A crankcase ventilation filter cartridge according to claim 15 wherein:
(a) the first seal member defines a seal plane extending at a smallest acute angle of intersection within the range of 80°-89°, inclusive, relative to the cartridge central axis.

19. A crankcase ventilation filter cartridge comprising:
(a) first and second, opposite, end pieces;
(b) a media pack comprising media positioned between the first and second end pieces; the media surrounding and defining an open filter interior and a cartridge central axis;
(i) the media defining an media inner perimeter and a media outer perimeter;
(c) a first seal support projection positioned on the first end piece and located on an opposite side of the first end piece from the media pack;
(d) a first seal member positioned on, and around, the first seal support projection;
(i) the first seal member defining a circular perimeter, in projection into a plane orthogonal to the cartridge central axis;
(ii) the first seal member defining a seal plane non-orthogonal to the cartridge central axis; and,
(iii) the first seal member defining a seal perimeter having a size, in projection into a plane orthogonal to the cartridge central axis, that is smaller than the media outer perimeter;
(e) a first member of an anti-rotation projection/receiver arrangement positioned to engage a portion of a filter housing, in use, to prevent relative rotation between the filter cartridge and the engaged portion of the filter housing; and, (f) a second seal member positioned on, and around, an outer perimeter of the second end piece.

20. A crankcase ventilation filter cartridge comprising:
(a) first and second, opposite, end pieces;
(b) a media pack comprising media positioned between the first and second end pieces; the media surrounding and defining an open filter interior and a cartridge central axis;
　(i) the media defining an media inner perimeter and a media outer perimeter;
(c) a first seal support projection positioned on the first end piece and located on an opposite side of the first end piece from the media pack;
(d) a first seal member positioned on, and around, the first seal support projection;
　(i) the first seal member defining a circular perimeter, in projection into a plane orthogonal to the cartridge central axis;
　(ii) the first seal member defining a seal plane non-orthogonal to the cartridge central axis; and,
　(iii) the first seal member defining a seal perimeter having a size, in projection into a plane orthogonal to the cartridge central axis, that is smaller than the media outer perimeter;
(e) a first member of an anti-rotation projection/receiver arrangement positioned to engage a portion of a filter housing, in use, to prevent relative rotation between the filter cartridge and the engaged portion of the filter housing; and,
(f) a second seal member on the second end piece including a lower skirt lip directed both: downwardly away from the media pack; and, radially outwardly from the cartridge central axis.

21. A crankcase ventilation filter cartridge comprising:
(a) first and second, opposite, end pieces;
(b) a media pack comprising media positioned between the first and second end pieces; the media surrounding and defining an open filter interior and a cartridge central axis;
　(i) the media defining an media inner perimeter and a media outer perimeter;
(c) a first seal support projection positioned on the first end piece and located on an opposite side of the first end piece from the media pack;
(d) a first seal member positioned on, and around, the first seal support projection;
　(i) the first seal member defining a circular perimeter, in projection into a plane orthogonal to the cartridge central axis;
　(ii) the first seal member defining a seal plane non-orthogonal to the cartridge central axis; and,
　(iii) the first seal member defining a seal perimeter having a size, in projection into a plane orthogonal to the cartridge central axis, that is smaller than the media outer perimeter;
(e) a first member of an anti-rotation projection/receiver arrangement positioned to engage a portion of a filter housing, in use, to prevent relative rotation between the filter cartridge and the engaged portion of the filter housing; and,
(f) a second seal member on the second end piece including at least two radially outwardly directed, spaced, radial seal lips.

22. A crankcase ventilation filter cartridge comprising:
(a) first and second, opposite, end pieces;
(b) a media pack comprising media positioned between the first and second end pieces; the media surrounding and defining an open filter interior and a cartridge central axis;
　(i) the media defining an media inner perimeter and a media outer perimeter;
(c) a first seal support projection positioned on the first end piece and located on an opposite side of the first end piece from the media pack;
(d) a first seal member positioned on, and around, the first seal support projection;
　(i) the first seal member defining a circular perimeter, in projection into a plane orthogonal to the cartridge central axis;
　(ii) the first seal member defining a seal plane non-orthogonal to the cartridge central axis; and,
　(iii) the first seal member defining a seal perimeter having a size, in projection into a plane orthogonal to the cartridge central axis, that is smaller than the media outer perimeter;
(e) a first member of an anti-rotation projection/receiver arrangement positioned to engage a portion of a filter housing, in use, to prevent relative rotation between the filter cartridge and the engaged portion of the filter housing;
(f) the first seal member defines a free lip of: at least 1 mm outer extension; a thickness within the range of 1 to 2 mm, inclusive; and, greater outer extension than thickness.

23. A crankcase ventilation filter cartridge comprising:
(a) first and second, opposite, end pieces;
(b) a media pack comprising media positioned between the first and second end pieces; the media surrounding and defining an open filter interior and a cartridge central axis;
　(i) the media defining an media inner perimeter and a media outer perimeter;
(c) a first seal support projection positioned on the first end piece and located on an opposite side of the first end piece from the media pack;
(d) a first seal member positioned on, and around, the first seal support projection;
　(i) the first seal member defining a circular perimeter, in projection into a plane orthogonal to the cartridge central axis;
　(ii) the first seal member defining a seal plane non-orthogonal to the cartridge central axis; and,
　(iii) the first seal member defining a seal perimeter having a size, in projection into a plane orthogonal to the cartridge central axis, that is smaller than the media outer perimeter;
(e) a first member of an anti-rotation projection/receiver arrangement positioned to engage a portion of a filter housing, in use, to prevent relative rotation between the filter cartridge and the engaged portion of the filter housing; and,
(f) a central projection on the second end piece; the central projection surrounding and defining a liquid flow conduit and projecting in a direction away from the media.

24. A crankcase ventilation filter cartridge according to claim 23 wherein:
(a) the central projection defines a tip with a receiver gap therein.

25. A crankcase ventilation filter cartridge according to claim 23 wherein:
   (a) the central projection defines a liquid flow conduit having a cross-sectional size no greater than a size corresponding to a dimension across the media at a one-half media thickness location with the same media inner perimeter.

26. A crankcase ventilation filter cartridge according to claim 23 wherein:
   (a) the central projection defines a liquid flow conduit having a cross-sectional size smaller than a cross-sectional size of the media inner perimeter and which is not in overlap with the media.

* * * * *